US008060584B1

(12) United States Patent
Rosenberg et al.

(10) Patent No.: US 8,060,584 B1
(45) Date of Patent: Nov. 15, 2011

(54) PERSONALIZED AUDIO SYSTEM AND METHOD

(75) Inventors: Jeremy C. Rosenberg, Havre de Grace, MD (US); Ronald M. Yurman, Short Hills, NJ (US)

(73) Assignee: Music Choice, Horsham, PA (US)

( * ) Notice: Subject to any disclaimer, the term of this patent is extended or adjusted under 35 U.S.C. 154(b) by 0 days.

(21) Appl. No.: 12/425,816

(22) Filed: Apr. 17, 2009

Related U.S. Application Data

(60) Division of application No. 11/371,946, filed on Mar. 10, 2006, now Pat. No. 7,555,539, which is a continuation of application No. 09/800,956, filed on Mar. 8, 2001, now Pat. No. 7,028,082.

(60) Provisional application No. 60/187,894, filed on Mar. 8, 2000.

(51) Int. Cl.
*G06F 15/16* (2006.01)

(52) U.S. Cl. ......................... 709/219; 709/231

(58) Field of Classification Search .................. 709/231, 709/242, 219; 705/14, 57; 455/553.1; 84/609; 704/270; 725/61, 67
See application file for complete search history.

(56) References Cited

U.S. PATENT DOCUMENTS

| | | | |
|---|---|---|---|
| 4,127,796 A | 11/1978 | Henderson | |
| RE29,997 E | 5/1979 | den Toonder | |
| 4,336,478 A | 6/1982 | Quilty et al. | |
| 4,338,623 A | 7/1982 | Asmus et al. | |
| 4,360,805 A | 11/1982 | Andrews et al. | |
| 4,677,430 A | 6/1987 | Falkman et al. | |
| 4,722,005 A | 1/1988 | Ledenbach | |
| 4,760,455 A | 7/1988 | Nagashima | |
| 4,799,156 A | 1/1989 | Shavit et al. | |
| 4,823,386 A | 4/1989 | Dumbauld et al. | |
| 5,130,615 A | 7/1992 | George | |
| 5,193,006 A | 3/1993 | Yamazaki | |
| 5,235,680 A | 8/1993 | Bijnagte | |
| 5,315,448 A | 5/1994 | Ryan | |
| 5,341,350 A | 8/1994 | Frank et al. | |
| 5,355,302 A | 10/1994 | Martin et al. | |
| 5,365,381 A | 11/1994 | Scheffler | |
| 5,371,551 A | 12/1994 | Logan et al. | |
| 5,418,654 A | 5/1995 | Scheffler | |
| 5,420,838 A | 5/1995 | Maeda et al. | |
| 5,481,296 A | 1/1996 | Cragun et al. | |
| 5,534,911 A | 7/1996 | Levitan | |
| 5,550,863 A | 8/1996 | Yurt et al. | |
| 5,557,541 A | 9/1996 | Schulhof et al. | |
| 5,572,442 A | 11/1996 | Schulhof et al. | |

(Continued)

FOREIGN PATENT DOCUMENTS

EP    1022900    7/2000

(Continued)

OTHER PUBLICATIONS

Decision in Arista Records, LLC et al. v. Launch Media, Inc., Case No. 07-2576-cv, United States Court of Appeals for the Second Circuit, decided Aug. 21, 2009, 42 pages.

(Continued)

*Primary Examiner* — Jungwon Chang

(74) *Attorney, Agent, or Firm* — Rothwell, Figg, Ernst & Manbeck, P.C.

(57) ABSTRACT

A personalized audio system and method that overcomes many of the broadcast-type disadvantages associated with conventional radio stations.

22 Claims, 28 Drawing Sheets

U.S. PATENT DOCUMENTS

| | | |
|---|---|---|
| 5,585,866 A | 12/1996 | Miller et al. |
| 5,590,282 A | 12/1996 | Clynes |
| 5,592,511 A | 1/1997 | Schoen et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,646,992 A | 7/1997 | Subler et al. |
| 5,675,734 A | 10/1997 | Hair |
| 5,708,780 A | 1/1998 | Levergood et al. |
| 5,721,815 A | 2/1998 | Ottesen et al. |
| 5,726,909 A | 3/1998 | Krikorian |
| 5,734,719 A | 3/1998 | Tsevdos et al. |
| 5,734,961 A | 3/1998 | Castille |
| 5,751,282 A | 5/1998 | Girard et al. |
| 5,751,806 A | 5/1998 | Ryan |
| 5,753,844 A | 5/1998 | Matsumoto |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,771,435 A | 6/1998 | Brown |
| 5,781,889 A | 7/1998 | Martin et al. |
| 5,784,095 A | 7/1998 | Robbins et al. |
| 5,784,595 A | 7/1998 | Devins et al. |
| 5,790,935 A | 8/1998 | Payton |
| 5,793,980 A | 8/1998 | Glaser et al. |
| 5,809,144 A | 9/1998 | Sirbu et al. |
| 5,809,246 A | 9/1998 | Goldman |
| 5,819,049 A | 10/1998 | Rietmann |
| 5,819,160 A | 10/1998 | Foladare et al. |
| 5,835,487 A | 11/1998 | Campanella |
| 5,841,979 A | 11/1998 | Schulhof et al. |
| 5,848,398 A | 12/1998 | Martin et al. |
| 5,861,906 A | 1/1999 | Dunn et al. |
| 5,878,141 A | 3/1999 | Daly et al. |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,830 A | 5/1999 | Scheffler |
| 5,913,204 A | 6/1999 | Kelly |
| 5,918,213 A | 6/1999 | Bernard et al. |
| 5,926,624 A | 7/1999 | Katz et al. |
| 5,930,765 A | 7/1999 | Martin |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,961,662 A | 10/1999 | Yamaguchi et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,983,069 A | 11/1999 | Cho et al. |
| 5,986,692 A | 11/1999 | Logan et al. |
| 5,991,374 A | 11/1999 | Hazenfield |
| 5,991,737 A | 11/1999 | Chen |
| 6,005,597 A | 12/1999 | Barrett et al. |
| 6,011,761 A | 1/2000 | Inoue |
| 6,011,854 A | 1/2000 | Van Ryzin |
| 6,020,883 A | 2/2000 | Herz et al. |
| 6,021,432 A | 2/2000 | Sizer, II et al. |
| 6,025,868 A | 2/2000 | Russo |
| 6,038,591 A | 3/2000 | Wolfe et al. |
| 6,055,314 A | 4/2000 | Spies et al. |
| 6,055,566 A | 4/2000 | Kikinis |
| 6,085,235 A | 7/2000 | Clarke, Jr. et al. |
| 6,088,455 A | 7/2000 | Logan et al. |
| 6,088,722 A | 7/2000 | Herz et al. |
| 6,105,060 A | 8/2000 | Rothblatt |
| 6,135,646 A | 10/2000 | Kahn et al. |
| 6,141,488 A | 10/2000 | Knudson et al. |
| 6,151,634 A | 11/2000 | Glaser et al. |
| 6,154,772 A | 11/2000 | Dunn et al. |
| 6,161,142 A | 12/2000 | Wolfe et al. |
| 6,192,340 B1 * | 2/2001 | Abecassis ................ 704/270 |
| 6,223,210 B1 | 4/2001 | Hickey |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,232,539 B1 | 5/2001 | Looney et al. |
| 6,233,682 B1 | 5/2001 | Fritsch |
| 6,240,553 B1 | 5/2001 | Son et al. |
| 6,243,725 B1 | 6/2001 | Hempleman et al. |
| 6,246,672 B1 | 6/2001 | Lumelsky |
| 6,248,946 B1 * | 6/2001 | Dwek ........................ 84/609 |
| 6,249,810 B1 | 6/2001 | Kiraly |
| 6,253,235 B1 | 6/2001 | Estes |
| 6,253,237 B1 | 6/2001 | Story et al. |
| 6,253,246 B1 | 6/2001 | Nakatsuyama |
| 6,262,772 B1 | 7/2001 | Shen et al. |
| 6,279,040 B1 | 8/2001 | Ma et al. |
| 6,286,139 B1 | 9/2001 | Decinque |
| 6,287,124 B1 | 9/2001 | Yamaura et al. |
| 6,305,020 B1 | 10/2001 | Hoarty et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. |
| 6,351,442 B1 | 2/2002 | Tagawa et al. |
| 6,356,971 B1 | 3/2002 | Katz et al. |
| 6,369,851 B1 | 4/2002 | Marflak et al. |
| 6,389,467 B1 | 5/2002 | Eyal |
| 6,393,430 B1 | 5/2002 | Van Ryzin |
| 6,418,421 B1 | 7/2002 | Hurtado et al. |
| 6,434,621 B1 | 8/2002 | Pezzillo et al. |
| 6,434,747 B1 | 8/2002 | Khoo et al. |
| 6,445,306 B1 | 9/2002 | Trovato et al. |
| 6,446,080 B1 | 9/2002 | Van Ryzin et al. |
| 6,446,130 B1 | 9/2002 | Grapes |
| 6,490,728 B1 | 12/2002 | Kitazato et al. |
| 6,505,240 B1 | 1/2003 | Blumenau |
| 6,507,727 B1 | 1/2003 | Henrick |
| 6,526,411 B1 | 2/2003 | Ward |
| 6,529,946 B2 | 3/2003 | Yokono et al. |
| 6,530,082 B1 | 3/2003 | Del Sesto et al. |
| 6,550,011 B1 | 4/2003 | Sims, III |
| 6,587,127 B1 | 7/2003 | Leeke et al. |
| 6,587,837 B1 | 7/2003 | Spagna et al. |
| 6,611,813 B1 | 8/2003 | Bratton |
| 6,647,417 B1 | 11/2003 | Hunter et al. |
| 6,674,993 B1 | 1/2004 | Tarbouriech |
| 6,701,355 B1 | 3/2004 | Brandt et al. |
| 6,748,237 B1 * | 6/2004 | Bates et al. ................ 455/553.1 |
| 6,748,427 B2 | 6/2004 | Drosset et al. |
| 6,766,357 B1 | 7/2004 | Fandozzi |
| 6,782,550 B1 | 8/2004 | Cao |
| 6,789,106 B2 | 9/2004 | Eyer et al. |
| 6,792,280 B1 | 9/2004 | Hori et al. |
| 6,823,225 B1 | 11/2004 | Sass |
| 6,842,604 B1 | 1/2005 | Cook et al. |
| 6,865,550 B1 | 3/2005 | Cok |
| 6,898,800 B2 | 5/2005 | Son et al. |
| 6,910,220 B2 | 6/2005 | Hickey et al. |
| 6,925,489 B1 | 8/2005 | Curtin |
| 6,933,433 B1 | 8/2005 | Porteus et al. |
| 6,959,220 B1 | 10/2005 | Wiser et al. |
| 6,985,694 B1 | 1/2006 | De Bonet et al. |
| 7,010,492 B1 | 3/2006 | Bassett et al. |
| 7,020,888 B2 | 3/2006 | Reynolds et al. |
| 7,024,678 B2 | 4/2006 | Gordon et al. |
| 7,028,082 B1 | 4/2006 | Rosenberg et al. |
| 7,054,547 B1 | 5/2006 | Abecassis |
| 7,065,287 B1 | 6/2006 | Heredia et al. |
| 7,076,561 B1 | 7/2006 | Rosenberg et al. |
| 7,111,099 B2 | 9/2006 | Alexander et al. |
| 7,133,924 B1 | 11/2006 | Rosenberg et al. |
| 7,149,471 B1 | 12/2006 | Arisawa et al. |
| 7,181,297 B1 | 2/2007 | Pluvinage et al. |
| 7,185,355 B1 | 2/2007 | Ellis et al. |

| | | | |
|---|---|---|---|
| 7,209,892 B1 | 4/2007 | Galuten et al. | |
| 7,321,923 B1 | 1/2008 | Rosenberg et al. | |
| 7,325,043 B1 | 1/2008 | Rosenberg et al. | |
| 7,343,179 B1 | 3/2008 | Theis et al. | |
| 7,370,016 B1* | 5/2008 | Hunter et al. | 705/57 |
| 7,555,539 B1 | 6/2009 | Rosenberg et al. | |
| 7,657,910 B1 | 2/2010 | McAulay et al. | |
| 7,711,838 B1* | 5/2010 | Boulter et al. | 709/231 |
| 7,797,446 B2* | 9/2010 | Heller et al. | 709/242 |
| 2001/0032312 A1 | 10/2001 | Runje et al. | |
| 2001/0042107 A1 | 11/2001 | Palm | |
| 2001/0049826 A1 | 12/2001 | Wilf | |
| 2002/0021708 A1 | 2/2002 | Ishiai | |
| 2002/0023164 A1 | 2/2002 | Lahr | |
| 2002/0023166 A1 | 2/2002 | Bar-Noy et al. | |
| 2002/0032728 A1 | 3/2002 | Sako et al. | |
| 2002/0038359 A1 | 3/2002 | Ihara et al. | |
| 2002/0046084 A1 | 4/2002 | Steele et al. | |
| 2002/0056117 A1 | 5/2002 | Hasegawa et al. | |
| 2002/0056118 A1 | 5/2002 | Hunter et al. | |
| 2002/0059363 A1 | 5/2002 | Katz et al. | |
| 2002/0059621 A1 | 5/2002 | Thomas et al. | |
| 2002/0062261 A1 | 5/2002 | Mukai | |
| 2002/0083148 A1 | 6/2002 | Shaw et al. | |
| 2002/0138630 A1 | 9/2002 | Solomon et al. | |
| 2002/0147634 A1* | 10/2002 | Jacoby et al. | 705/14 |
| 2002/0152278 A1 | 10/2002 | Pontenzone et al. | |
| 2002/0194260 A1 | 12/2002 | Headley et al. | |
| 2002/0194619 A1 | 12/2002 | Chang et al. | |
| 2003/0023975 A1 | 1/2003 | Schrader et al. | |
| 2003/0050058 A1 | 3/2003 | Walsh et al. | |
| 2003/0097338 A1 | 5/2003 | Mankovich et al. | |
| 2003/0126595 A1 | 7/2003 | Sie et al. | |
| 2003/0135464 A1 | 7/2003 | Mourad et al. | |
| 2003/0182184 A1 | 9/2003 | Strasnick et al. | |
| 2003/0187739 A1* | 10/2003 | Powers | 705/14 |
| 2006/0173974 A1 | 8/2006 | Tang | |

FOREIGN PATENT DOCUMENTS

| | | |
|---|---|---|
| WO | WO9737492 | 10/1997 |
| WO | WO9917230 | 4/1999 |
| WO | WO9948296 | 9/1999 |
| WO | WO0007368 | 2/2000 |
| WO | WO0136064 | 5/2001 |

OTHER PUBLICATIONS

Office Action issued on Aug. 19, 2009 in U.S. Appl. No. 11/928,904, 9 pages.
Office Action issued on Sep. 4, 2009 in U.S. Appl. No. 11/783,426, 11 pages.
Office Action issued on Dec. 31, 2009 in U.S. Appl. No. 11/928,932, 12 pages.
Office Action issued on Nov. 13, 2009 in U.S. Appl. No. 10/098,620, 21 pages.
Office Action issued on Feb. 9, 2010 in U.S. Appl. No. 11/928,904, 14 pages.
Office Action issued on Jan. 27, 2010 in U.S. Appl. No. 12/003,784, 9 pages.
6 Pages from the web site for www.request.com, Jun. 22, 2004.
ntl: Digital Radio. http://www.ntl.com/locales/gb/en/guides/dummies/produce.asp 2 pages, Aug. 13, 2002.
Deutsche Telekom AG: Digital Radio http://vvww.telekom.de/dtag/ipll/cda/level3a/036801007700.html 1 page, Aug. 18, 2000.
The Eureka 147 Consortium "Digital Audio Broadcasting" http://www.eurekadab.org/eureka_147_consortium.htm 3 pages, Aug. 14, 2000.
http://launch.yahoo.com "Music on Yahoo" 2 pages, Jun. 25, 2004.
Loeb S. "Architecting Personalized Delivery of Multimedia Information" Communications of the ACM Dec. 1992 vol. 35 No. 12 pp. 39-48 (10 pages).
Office Action issued on Oct. 1, 2010 in U.S. Appl. No. 11/928,959, 13 pages.
Office Action issued on Oct. 13, 2010 in U.S. Appl. No. 11/928,904, 11 pages.
Office Action issued on Jul. 23, 2010 in U.S. Appl. No. 12/003,784, 9 pages.
Office Action issued on Jul. 8, 2010 in U.S. Appl. No. 11/928,932, 11 pages.
Clark D. ClickRadio to Start Digital Music Services WSJ Interactive Edition 2000.
"ClickRadio granted first interactive radio license by universal music group; . . . " www.clickradio.com printed Apr. 20 2000.
Gordon C. "ClickRradio sidesteps competition with music licensing deals" Atnewyork.com. May 12, 2000.
"Phillips showcases clickradio on digital set-top at western show 2000; . . . " Business Wire Inc. Nov. 29, 2000.
Web site for www.sonicnet.com. printed Jun. 22, 2004 6 pages.
Bower "Digital Radio—A Revolution for In-Car Entertainment" Proc. NavPos Automative '98 Conf. vol. 2 Session 5-8 10 pages Jun. 10, 1998.
Radio Authority Digital Radio Fact Sheet No. 4 1999. http://www.radioauthority.org.uk/Information/Fact_Sheets/fs4.htm 5 pages.
"The ICTV Digital Broadband System" ICTV Inc. White Paper 2000 11 pages.
"Sonicbox brings Net radio into your living room" (Partyka Jeff. Oct. 12 1999. CNN.com) 3 pages.
"Internet Radio Listeners Unchained From Their PCs" (Olenick Doug. Oct. 25 1999. Twice Computer Technology) 1 page.
"Sonicbox and Microsoft Bring Windows Media Internet Radio to the Home Stereo" (Dec. 7, 1999 Microsoft Press Release) 3 pages.
King "Tune on Tune in Drop cash" Dec. 8, 2000 Wired News 2 pages.
"Global Media Announces Launch of Independent Internet Radio station"; News Release Feb. 1, 1999 2 pages.
"Platinum Entertainment and Liquid Audio Join Forces to Offer Extensive Music Catalog via Digital Downloads" Press Relaese Jul. 15, 1998 2 pages.
LaFrance "Thinking Globally with a web-based radio station vying for listeners around the world homegrown internet company fastband aims to shake up the music world" Times Picayune Nov. 4 1999 2 pages.
"Tune into Yahoo! Radio" Yahoo Media Relations Press Release Yahoo! teams up with Broadcast.com and Spinner.com to Provide 10 stations of Audio Programming May 11, 1999 2 pages.
Yahoo Offers one-stop shop for e-music Milwaulkee Journal Sentinel (Wisconsin) Aug. 25 1999 1 page.
uniView Technologies Now in Yahoo!'s Multicast Affiliate Program Press Release Newswire Association Inc. Oct. 19, 1999 2 pages.
"WebRadio.com Signs on as Liquid Music Network Affiliate Offering Liquid Audio Digital Downloads" Business Wire Inc. Sep. 1, 1999 2 pages.
"Blue Note Radio" Now Playing on a Computer Screen Near You. EMI's Blue Note Records Expands New Media Initiative with RadioWave.com Press Release Newswire Association Inc. Apr. 4, 2000 2 pages.
"Set-top box for television that reads your mind" Financial Times Limited Dec. 30, 1998 1 page.
Rajapakshe H. et al. "Video on Demand" Jun. 1995 pp. 1-15 (http://www.doc.ic.ac.uld—nd/surprise_95/journal/vol4/shr/report.html).
Welz G. "Integrated Streaming Technologies" Oct. 30, 1996 pp. 1-3.
Office Action issued on Sep. 28, 2007 in U.S. Appl. No. 10/098,620, 19 pages.
Office Action issued on Mar. 16, 2005 in U.S. Appl. No. 09/800,956, 20 pages.
Office Action issued on Aug. 30, 2005 in U.S. Appl. No. 10/098,473, 8 pages.
Office Action issued on Aug. 30, 2005 in U.S. Appl. No. 10/098,450, 8 pages.
Office Action issued on Aug. 23, 2005 in U.S. Appl. No. 10/098,620, 15 pages.
Office Action issued on Jun. 15, 2006 in U.S. Appl. No. 10/098,620, 14 pages.
Office Action issued on Aug. 29, 2006 in U.S. Appl. No. 10/339,425, 19 pages.
Office Action issued on Dec. 6, 2006 in U.S. Appl. No. 11/002,181, 10 pages.

Office Action issued on Jun. 8, 2007 in U.S. Appl. No. 11/002,181, 13 pages.
Office Action issued on Mar. 13, 2007 in U.S. Appl. No. 10/339,425, 13 pages.
Office Action issued on May 30, 2007 in U.S. Appl. No. 10/339,425, 3 pages.
Office Action issued on Apr. 4, 2007 in U.S. Appl. No. 10/098,620, 12 pages.
Office Action issued on Aug. 23, 2005 in U.S. Appl. No. 10/098,620, 15 pages.
Office Action issued on Jun. 15, 2006 in U.S. Appl. No. 10/098,620, 14 pages.
Office Action issued on Apr. 4, 2007 in U.S. Appl. No. 10/098,620, 12 pages.
Office Action issued on Apr. 4, 2008 in U.S. Appl. No. 10/098,620, 24 pages.
Shareware Music Machine News, Shareware Music Machine.com, "MusicMatch Jukebox 6.0 gets personal", Press Release, Oct. 6, 2000, 4 pages.
United States Code Service, 17 USCS 114, Scope of Exclusive Rights in Sound Recordings, 2000, 12 pages.
Adolphe V. Bemotas, "Computers and TV: Marriage of the Future:[Five Star Lift Edition]", St. Louis Post—Dispatch, Oct. 11, 1995, 1 page.
John Sweeney, "An Introduction to Interactive Television", International Broadcasting Convention, 1994, pp. 503-508.
Office Action issued on Nov. 3, 2008 in U.S. Appl. No. 10/098,620, 21 pages.
Office Action issued on Apr. 6, 2009 in U.S. Appl. No. 10/098,620, 19 pages.

* cited by examiner

PLAY-LIST FOR AUDIO CHANNEL: JAZZ/BLUES

| SOUND RECORDING ID | GENRE(S) | STYLE(S) | OWNED BY USER? | META-DATA |
|---|---|---|---|---|
| SONG-TITLE 1 | JAZZ | STYLE 2<br>STYLE 5<br>STYLE 8 | NO | ARTIST NAME, ALBUM, DATE ... |
| SONG-TITLE 2 | BLUES<br>ROCK | STYLE 1<br>STYLE 2 | YES | |
| ... | | | | |
| SONG-TITLE N | JAZZ | STYLE 1 | NO | |

FIG.4

WANTED LIST FOR AUDIO CHANNEL: JAZZ/BLUES

~215

| SOUND RECORDING ID | GENRE(S) | STYLE(S) | OWNED BY USER? | IN LIBRARY? | META-DATA |
|---|---|---|---|---|---|
| SONG-TITLE 1 | JAZZ | STYLE 2<br>STYLE 5<br>STYLE 8 | NO | YES | ARTIST NAME, ALBUM |
| SONG-TITLE 2 | BLUES<br>ROCK | STYLE 1<br>STYLE 2 | YES | YES | |
| ... | | | | | |
| SONG-TITLE N | JAZZ | STYLE 1 | NO | NO | |

FIG.5

CREATE/MODIFY A PROFILE

CHANNEL NAME: MY-CHANNEL

GENRES:
(SELECT ONE OR MORE GENRES)
- ☐ ROCK
- ☐ ALTERNATIVE
- ☐ COUNTRY
- ☒ BLUES
- ☒ JAZZ
- ☐ TOP 40
- ☐ EASY LISTENING
- ☐ 80's MUSIC

[GENRE EQ]

FAVORITE ARTISTS: U2, REM, RADIOHEAD

LEAST FAVORITE ARTISTS:

FAVORITE SONGS:

LEAST FAVORITE SONGS:

NEWS CATEGORIES: SPORTS, WEATHER, TRAFFIC

[DONE]

NEWS KEYWORD:

FIG.15

| MUSIC CHANNEL | MASTER PLAYLIST | STATE |
|---|---|---|
| ROCK | ROCK-PLAYLIST | ACTIVE |
| JAZZ | JAZZ-PLAYLIST | ACTIVE |
| ... | ... | ... |

FIG. 24

| LIBRARY CATALOGUE | | | | | |
|---|---|---|---|---|---|
| SOUND RECORDING ID | LOCATION | OWNED BY USER? | GENRE(S) | STYLE(S) |
| SONG-TITLE 1 | C:/LIBRARY | YES | GENRE (1) GENRE (2) | STYLE 1 STYLE 2 STYLE 3 |
| SONG-TITLE 2 | C:/LIBRARY | NO | GENRE (5) | STYLE 7 |
| ... | ... | ... | | |

FIG.25

PERSONALIZED AUDIO SYSTEM AND METHOD

This application is a divisional of application Ser. No. 11/371,946, filed Mar. 10, 2006 (status Pending), which is a continuation of application Ser. No. 09/800,956, filed on Mar. 8, 2001 (now U.S. Pat. No. 7,028,082), which claims the benefit of U.S. Provisional Application Ser. No. 60/187,894, filed Mar. 8, 2000. Each of the above identified applications are incorporated herein by this reference.

BACKGROUND OF THE INVENTION

1. Field of the Invention

The present invention is generally related to systems for listening to music, and, more specifically, to a personalized audio system that gives a user of the system only limited control over the sound recordings that get played, but, nevertheless, plays the sound recordings that the user is likely to enjoy.

2. Discussion of the Background

Those that frequently listen to music broadcasters (e.g., conventional radio stations and other broadcasters of music) know all too well that the music broadcasters do not always play the songs that the listener wants to hear. This is due to the simple fact that music broadcasters must accommodate the tastes of a mass audience, and, as we all know, it is not possible to please all of the people all of the time. We each have our own unique likes and dislikes.

One solution to this problem is to increase the number of radio stations and/or the number of cable stations that carry music, and thereby increase the likelihood that a listener will find a station that is playing a "good" song. However, this is not a practical solution because there is only a finite amount of bandwidth available to broadcast music, and this bandwidth is already at or near capacity. Further, it is prohibitively expensive to create additional bandwidth.

What is desired, therefore, is a system to overcome these and other disadvantages of conventional music broadcasting systems.

SUMMARY OF THE INVENTION

The present invention provides a personalized audio system and method that overcomes many of the broadcast-type disadvantages by creating personalized audio channels. According to one embodiment, the personalized audio system includes the following: (1) a user interface that enables a user of the personalized audio system to specify a profile for a personalized audio channel, (2) a sound recording library comprising a plurality of sound recordings, (3) a playlist generator that (a) selects one or more sound recording identifiers from a set of sound recording identifiers, wherein each of the selected one or more sound recording identifiers identifies a sound recording that matches the profile and that is stored in the library, and that (b) creates a playlist that lists the selected one or more sound recording identifiers in a particular order, and (4) a sound recording reproducing device for reproducing each of the identified sound recordings according to the particular order in which the selected one or more sound recording identifiers are listed in the playlist so that the user can listen to the sound recordings.

Advantageously, the personalized audio system can restrict the user's ability to determine the selected one or more sound recording identifiers prior to the reproducing means reproducing the identified sound recordings, and the personalized audio system does not provide the user with a way to directly control which sound recording identifiers in the set are selected by the playlist generator to be included in the set of selected one or more sound recording identifiers.

According to one embodiment, a method of the present invention includes the steps of building a sound recording library on a storage device, the sound recording library having an associated library catalogue that identifies each sound recording that is in the library, receiving an indication from a user of the audio system that the user desires to listen to a selected audio channel, selecting a sound recording from the sound recording library based on the selected audio channel, retrieving from the sound recording library the selected sound recording, and playing the sound recording for the user.

Advantageously, in one embodiment, the step of building the sound recording library includes the steps of receiving through a receiver a broadcast sound recording, determining the identity of the broadcast sound recording, determining whether the sound recording is a needed sound recording or determining whether the user has indicated a preference for the sound recording, and adding the broadcast sound recording to the library if the broadcast sound recording is needed or the user has indicated a preference for the sound recording.

In another embodiment, the step of building the sound recording library includes the steps of: determining whether the user has one or more sound recordings that he or she would like to add to the sound recording library, and if the user has one or more sound recordings that he or she would like to add to the sound recording library, then (a) storing the one or more sound recordings on the storage device if they are not already stored thereon, (b) updating the library catalogue such that the one or more sound recordings are identified as being in the library, and (c) updating the library catalogue to indicate that the one more sound recordings are owned by the user.

According to another embodiment, a method of the present invention includes the steps of: receiving through the user interface input from the user, wherein the input indicates that the user desires to listen to a selected audio channel, the selected audio channel having a profile, selecting a sound recording that fits the profile of the selected audio channel, determining whether the user owns the selected sound recording, determining whether the selected sound recording should be pre-announced, wherein the determination is based at least in part on whether the selected sound recording is owned by the user, announcing the sound recording to the user before reproducing the sound recording only if it is determined that the sound recording should be pre-announced, and reproducing the sound recording so that the user may listen to the sound recording.

According to still another embodiment, a method of the present invention includes the steps of: receiving through a user interface input from a user, wherein the input comprises audio channel profile information, associating the profile information with an audio channel, receiving an indication from the user that the user desires to listen to the audio channel, selecting a set of sound recordings based on the profile information and based on a statute, regulation, and/or contract in response to receiving the indication from the user, and reproducing each selected sound recording for the user to hear, wherein the selected set of sound recordings are selected in a particular order and are reproduced in the particular order in which they are selected.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 4 is an illustration of a playlist, according to one embodiment.

FIG. 5 is an illustration of a wanted list, according to one embodiment.

FIG. 15 is an illustration of a GUI page for enabling user 110 to personalize an audio channel, according to one embodiment.

FIG. 24 is an illustration of a state stable, according to one embodiment.

FIG. 25 is an illustration of the library catalogue, according to one embodiment.

DETAILED DESCRIPTION OF THE PREFERRED EMBODIMENTS

Figure 1:
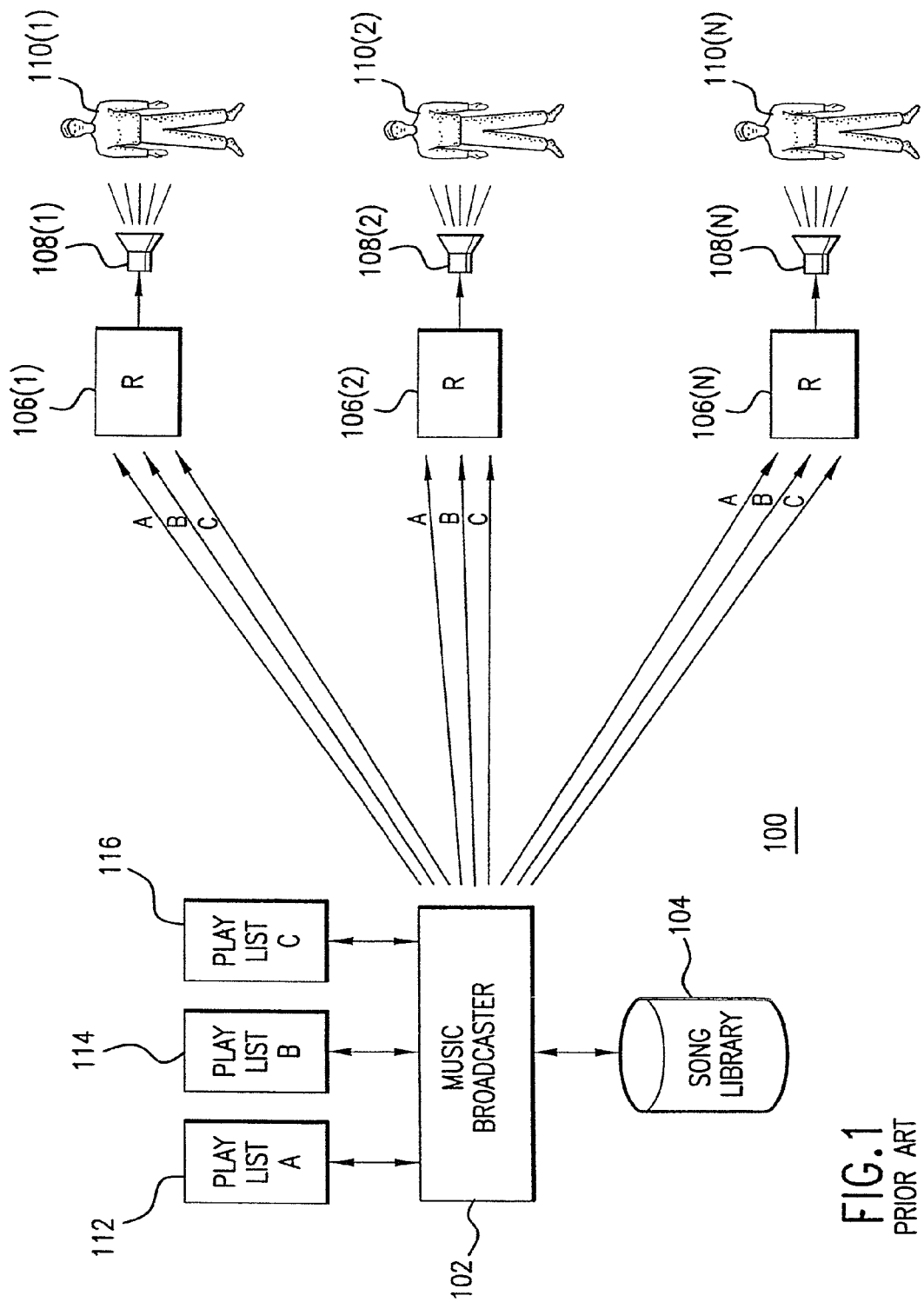
FIG. 1 is a diagram of a conventional music broadcasting system.

FIG. 1 is a diagram of a conventional music broadcasting system 100. As shown in FIG. 1, there is illustrated a music broadcaster 102 broadcasting sound recordings (e.g., songs) over three stations (stations A, B, and C) to listeners 110(1) 110(N). For the sake of simplicity, we can assume station A is devoted to Alternative music, station B is dedicated to Jazz, and station C is devoted to Classical music. Also for the sake of simplicity, FIG. 1 only shows a single music broadcaster. However, it is well understood that there could exist a number of music broadcasters like broadcaster 102, and that music broadcaster 102 may broadcast music over fewer or more stations than that shown. Additionally, broadcaster 102 may employ many networks and/or systems to broadcast music to listeners 110. Such networks/systems include: satellite networks, cable television networks, the Internet, conventional radio towers, and other like networks and systems.

Music broadcaster 102 has a master sound recording library 104 that contains a collection of sound recordings that are available to be broadcast to the listeners 110. Additionally, music broadcaster 102 has three playlists 112, 114, and 116. Each playlist is associated with one of the stations A, B, and C. As its name implies, a playlist contains an ordered list of sound recording identifiers (e.g., song titles) that identify the sound recordings that are to be broadcast to listeners 110. Music broadcaster 102 uses the playlists to determine which sound recordings to select from sound recording library 104 for broadcast to listeners 110. For example, the music broadcaster 102 may broadcast the sound recordings listed in the playlist in the order in which they are listed. The playlists may contain a day's worth of sound recordings, in which case, every day a new playlist is generated so that the music broadcaster 102 does not broadcast the same sound recordings in the same order two days in a row.

Listeners 110 each have at least a receiver 106 for receiving one of the stations of music and sound reproducing equipment 108 for reproducing the received music. Because each station of music is necessarily broadcast to each listener 110, music broadcaster 102 must select sound recordings to broadcast that will be favorable to a wide audience. In other words, play-lists 112, 114, and 116 each contain a list of sound recordings that are expected to be enjoyed by a mass audience, rather than any particular listener 110.

Because of bandwidth limitation problems, it may be too costly for music broadcaster 102 to create a personalized audio station for each listener 110. Thus, there may be times when broadcaster 102 is not broadcasting any sound recordings that a listener 110 prefers to receive. The system shown in FIG. 2 is designed to overcome this problem.

Personalized Audio System 200

Figure 2:
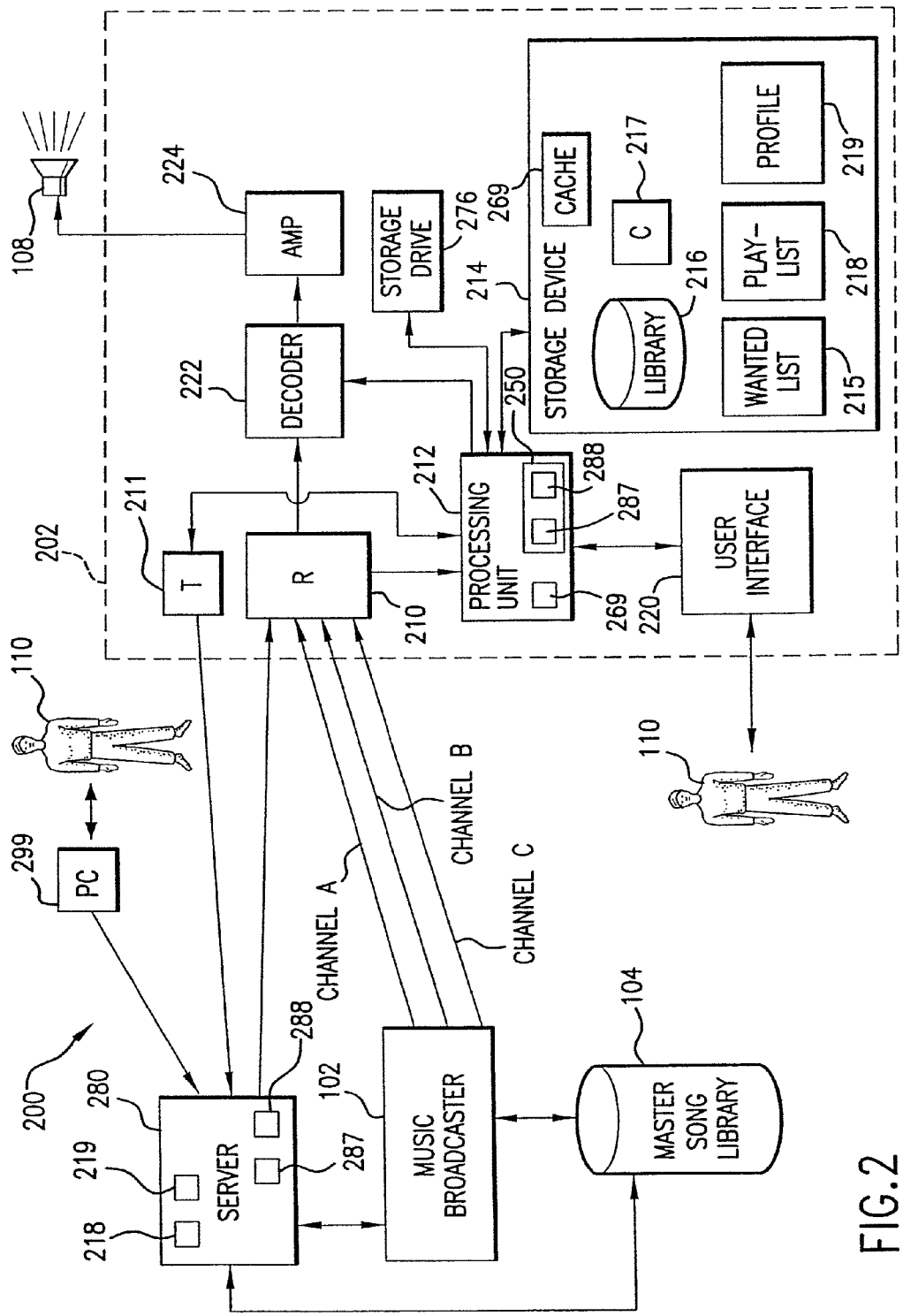
FIG. 2 is a diagram of personalized audio listening system, according to one embodiment.

FIG. 2 shows a functional block diagram of a personalized audio system 200 designed to enable listener 110 (also referred to as user 110) to listen to and create one or more "personalized" audio channels. A personalized audio channel may be similar to a conventional radio station in that the listener does not directly control the contents of the audio channel's playlist nor does user 110 have a means to view or otherwise determine the set of songs specified in the playlist. For example, user 110 does not control what songs get played when. But, unlike a conventional radio station, which plays the sound recordings that have a high likelihood of being enjoyed by a large audience, a personalized audio channel plays the sound recordings that have a high likelihood of appealing to user 110.

A personalized audio channel can be a music channel, an information channel, or a combination music/information channel. A personalized music channel may be designed to play only the music or songs that have a high appeal to the individual listener. Similarly, a personalized information channel plays sound recordings that contain information (e.g., stock quotes, sports news, weather information, etc.) that user 110 wants to hear.

Audio system 200 includes a consumer device 202 (also referred to as personal audio device 202) and (optionally) a remote server 280.

Consumer Device 202

A block diagram of consumer device 202, according to one embodiment, is illustrated in FIG. 2. In the illustrated embodiment, consumer device 202 includes one or more receivers 210 that are operable to tune to a particular broadcast audio or audio/video channel, a network transmitter or interface 211 for transmitting signals to other computers (such as server 280), a data processing unit 212, a persistent storage device 214, a user interface 220, a decoder 222, an amplifier 224, and a removable storage drive 276 (e.g., floppy disk drive or CD ROM drive). Any one or a combination of the following components may be optional: receiver 210, transmitter 211, storage device 214, decoder 222, amplifier 224, and storage drive 276.

Receiver 210 can be any device that can receive a data stream. For example, it can be any one or a combination of the following: a radio frequency (RF) receiver for receiving data streams broadcast by radio waves, a cable-tv receiver for receiving signals transmitted through an analog or digital cable-tv system, a satellite receiver for receiving signals transmitted by satellite, a network receiver for receiving data streams transmitted through a network (e.g., the Internet), etc. It is also contemplated that receiver 210 can function to transmit data as well as receive data, in which case separate transmitter 211 may not be needed, in which case device 210 is a transceiver.

Data processing unit 212 is adapted to control the operation of personal audio device 202 through a software program 250. Data processing unit 212 may include one or more programmable processors and memory (e.g., RAM and ROM) for storing data and software program 250. Based on the detailed description of the functionality of device 202 given below, one skilled in the art is able create program 250.

User interface 220 allows user 110 to interact with audio device 202. User interface 220 includes input devices (e.g., keyboard, mouse, infrared remote control, etc.) for user 110 to input commands to processing unit 212. Additionally, in one embodiment, user interface 220 includes a display screen for displaying a graphical user interface (GUI), which is generated by program 250, that enables user 110 to input commands and make selections. The display screen may be a standard television monitor, a standard computer monitor, or any other display device that is capable of displaying a user interface.

Storage device 214, in one embodiment, stores one or more sound recordings (referred to as local sound recording library 216). Preferably, to prevent theft and/or copyright violations and for other security reasons, each sound recording not owned by user 110 is encrypted and/or watermarked before the sound recording is placed in the library 216. User 110 may be considered to own a sound recording in the cases where the user has either purchased the sound recording or otherwise has unrestricted possession of the sound recording.

Storage device 214, in one embodiment, also stores a library catalogue 217. Catalogue 217 maintains a list of each sound recording that is in local sound recording library 216. FIG. 25 illustrates one embodiment of library catalogue 217. In this embodiment, for each sound recording in library 216, catalogue 217 keeps track of the genre(s) and style(s) to which the sound recording belongs and also keeps track of whether or not user 110 owns the sound recording.

In one embodiment, device 202 is a cable-tv set-top box or implemented within a cable-tv set-top box, server 280 is a "head-end sever" (i.e., located at a cable system head-end), and device 202 communicates with server 280 through the a cable-tv transmission system.

Features and Operation of Consumer Device 202

As appreciated by one skilled in the art, the features and operations described below are illustrative and not mean to limit the invention.

Preferably, consumer device 202 does not provide any of the features described below unless "authorized." In one embodiment, user 110 is authorized only if user 110 subscribes to a service provided by music broadcaster 102 or pays a certain sum money to a seller of consumer device 202.

Through user interface 220 and a software program 250, an authorized user 110 can perform a number of operations. User 110 can select to listen to a particular audio channel, modify or delete an existing audio channel, and, most importantly, create one or more personalized audio channels. In one embodiment, user 110 can also use a separate computer 299 to modify and delete existing audio channels and to create new audio channels, provided that computer 299 is able to communicate with remote server 280 or device 202.

Figure 6:
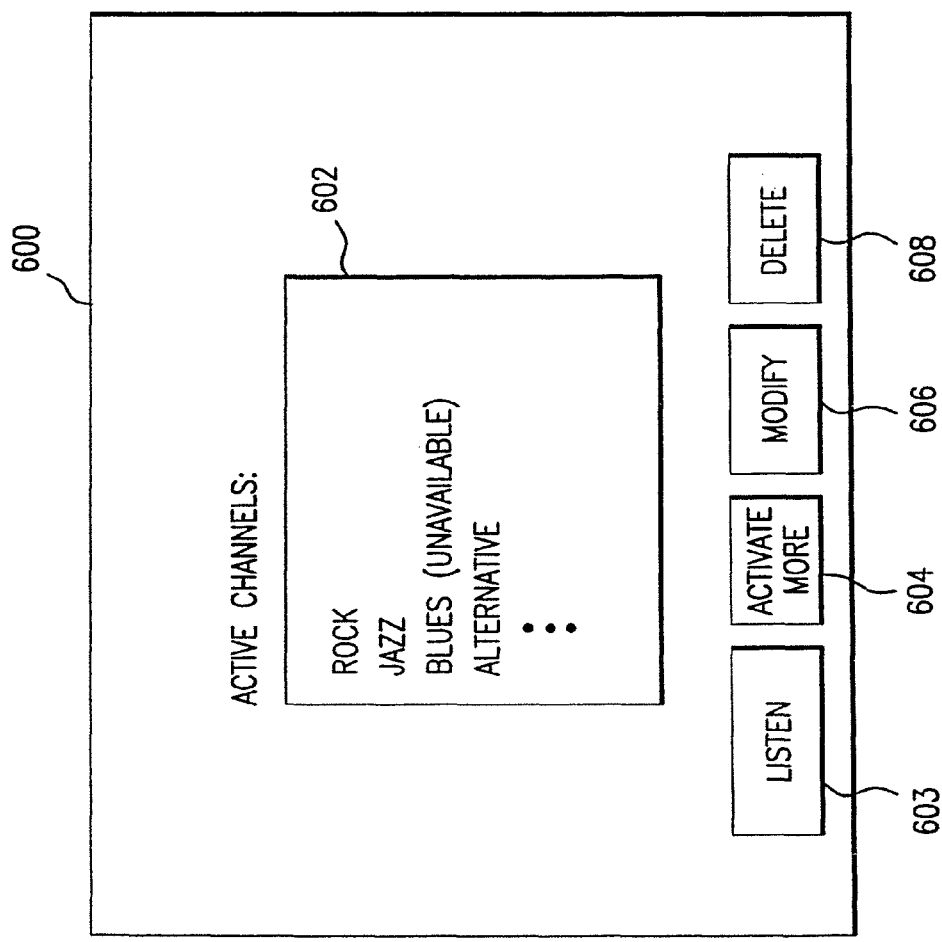
FIG. 6 is an illustration of a GUI page for enabling user 110 to select an audio channel to listen to, according to one embodiment.

FIG. 6 illustrates a user interface page 600, according to one embodiment, from which user 110 can (1) select an available, "active" channel to listen to, (2) activate additional channels, (3) modify an active channel, and (4) delete an active channel. An active channel is an audio channel defined within device 202 that user 110 may select to listen to. In contrast, an inactive channel is an audio channel defined within device 202 that user 110 may not select to listen to.

Page 600 includes a text window 602 for listing the active audio channels. Page 600 also includes a listen-button 603, an activate-button 604, a modify-button 606, a delete-button 608, and an off-button 609. In one embodiment, the first time user 110 uses device 202, there are no active audio channels, so the first step for user 110 is to activate one or more audio channels. User 110 performs this function by first selecting activate-button 604.

In response to user 110 activating button 604, a page 700 (see FIG. 7) is displayed to the user. Page 700 is referred to as the "activate audio channels page." From the activate audio channels page 700, user 110 can activate one or more audio channels and, more importantly, user 110 can create a personalized audio channel. The process of creating a personalized audio channel is described further below with reference to FIGS. 15-17.

Figure 7:
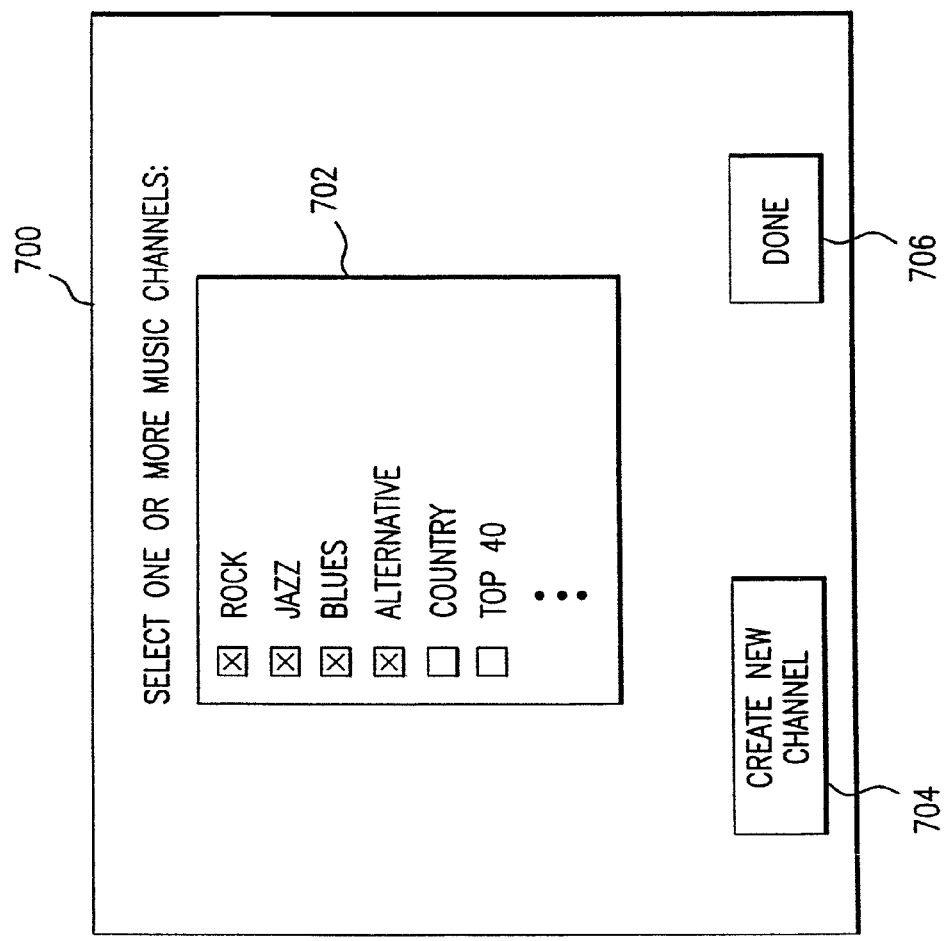
FIG. 7 is an illustration of a GUI page for enabling user 110 to activate predefined audio channels and to create new audio channels, according to one embodiment.

Referring now to FIG. 7, a text box 702 lists all of the audio channels that are defined within device 202. These channels may include pre-loaded and user-created audio channels. Device 202 may be pre-loaded with a variety of audio channels defined by a service provider (such as music broadcaster 102). The pre-loaded audio channels are identified according to the type of music and/or information associated with the channel. For example, as shown in page 700, the following six pre-loaded music channels were pre-loaded: (1) Rock, (2) Jazz, (3) Blues, (4) Alternative, (5) Country, and (6) Top-40. The pre-loaded audio channels may be personalized by user 110 as described herein.

When an audio channel is pre-loaded into device 202, in one embodiment, an audio channel profile 219 associated with the predefined audio channel is created and stored in storage device 214 or on remote server 280. Each pre-loaded and user-created audio channel in system 200 has a profile 219. A profile 219 contains profile information that is used in selecting the sound recordings that are played by the audio channel to which the profile 219 belongs. Profile information includes information related to or concerning a user's sound recording preferences. Profiles 219 are described in greater detail further below with reference to FIG. 3.

Additionally, in other embodiments, when an audio channel is pre-loaded, a plurality of sound recordings that match the audio channel's profile 219 are placed in library 216, the library catalogue 217 is appropriately updated, and/or a playlist 218 and/or a wanted list 215 associated with the audio channel is created and stored in storage device 214. Playlists 218 and wanted lists 215 are described in greater detail further below with reference to FIG. 4 and FIG. 5, respectively.

To activate one or more audio channels listed in window 702, user 110 selects one or more of the audio channels by placing a mark in one or more of the boxes adjacent to the audio channels and then selects done-button 706. In response to user 110 activating done-button 706, device 202 determines which of the listed channels were selected and then changes the state of the selected channels from in-active to active.

In one embodiment, device 202 maintains a state table 2400 (see FIG. 24) to keep track of the state of each defined audio channel. State table 2400 includes a number of records 2402 equal in number to the number of audio channels defined in the system. Each record 2402 includes three fields. The first field stores the name of an audio channel, the second field stores a playlist 218 identifier, a profile 219 identifier, and/or a wanted list 215 identifier that identifies the playlist 218, the profile 219, and/or the wanted list 215 associated with the audio channel, respectively. The third field stores a state identifier to identify the state of the channel.

Referring back to FIG. 6, page 600 enables user 110 to select to listen to an "available" active audio channel. In one embodiment, one or more of the active audio channels listed in window 602 may not be "available." For example, an active audio channel may not be available if device 202 does not have a receiver 210 and/or transmitter 211 and local sound recording library 216 does not contain a sufficient number and/or variety of sound recordings that match the profile of the audio channel. For instance, if a playlist that conforms to the Digital Millennium Copyright Act (DMCA) (or some other statute, regulation, or contract) cannot be created for a certain active audio channel because library 216 does not contain a sufficient number and/or variety of sound recordings that match the profile of the audio channel, then the audio channel may be "unavailable." Methods for adding sound recordings to library 216 for the purpose of, among other things, changing the status of a channel from unavailable to available are described further below with reference to FIGS. 18-22.

In one embodiment, user 110 listens to an "available" active audio channel by selecting one of the available, active audio channels listed in window 602 and then activating a listen-button 603. After user 110 selects an available channel and activates listen-button 603, device 202 plays one or more sound recordings that match the profile of the selected audio channel and a user interface page 800 (See FIG. 8) is displayed to user 110.

In one embodiment, from user 110's perspective, listening to an audio channel is very similar to listening to a conventional radio station. What we mean by this is that when listening to an audio channel, user 110 has no direct control over which songs get played and, in most cases, user has no way of determining the next song that is to be played.

User 110, however, has indirect control over which songs get played because user 110 has direct control over a channel's profile and a channel's profile specifies, among other things, the types of sound recordings that the channel play at least a majority of the time. Thus, user 110 can specify that a particular audio channel should play Hard Rock songs and/or other songs matching other characteristics (e.g., tempo) at least a majority of the time, but user 110 can not specify that a particular set of Hard Rock songs will be played in a particular order at any desired point in time. In other words, user 110 has no direct control over the audio channel's playlist or the process through which the audio channel selects songs to be played.

There is at least one exception to the above rule. User 110 may specify that a particular set of sound recordings is played in a particular order at a particular time if, and only if, user 110 owns a copy of each sound recording in the set.

Figure 8:
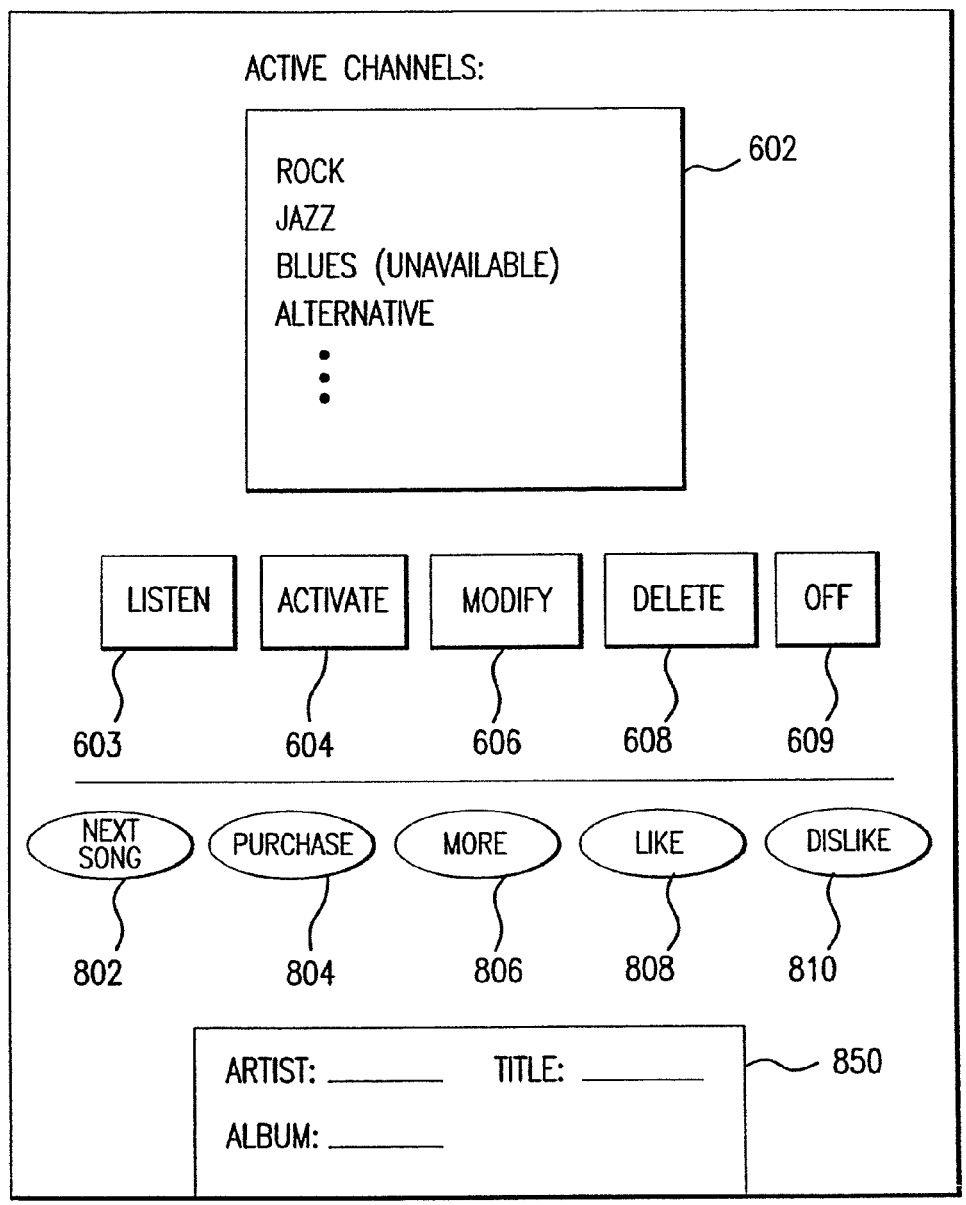
FIG. 8 is an illustration of a GUI page that is presented to user 110 after user 110 selects an audio channel to listen to, according to one embodiment.

Referring now to FIG. 8, page 800 is exactly like page 600 except that additional command-buttons and a meta-data display area 850 are included in page 800. The additional command-buttons include the following: a next-button 802, a purchase-button 804, a more-button 806, a like-button 808, and a dislike-button 810.

As is appreciated by those skilled in the art, user interface pages 600, 700, and 800 are not the only user interfaces that can be employed in the present invention. Thus, it is understood that page 600, 700 and 800 are used merely to illustrate an embodiment of the invention and not to limit the invention.

Figure 9:
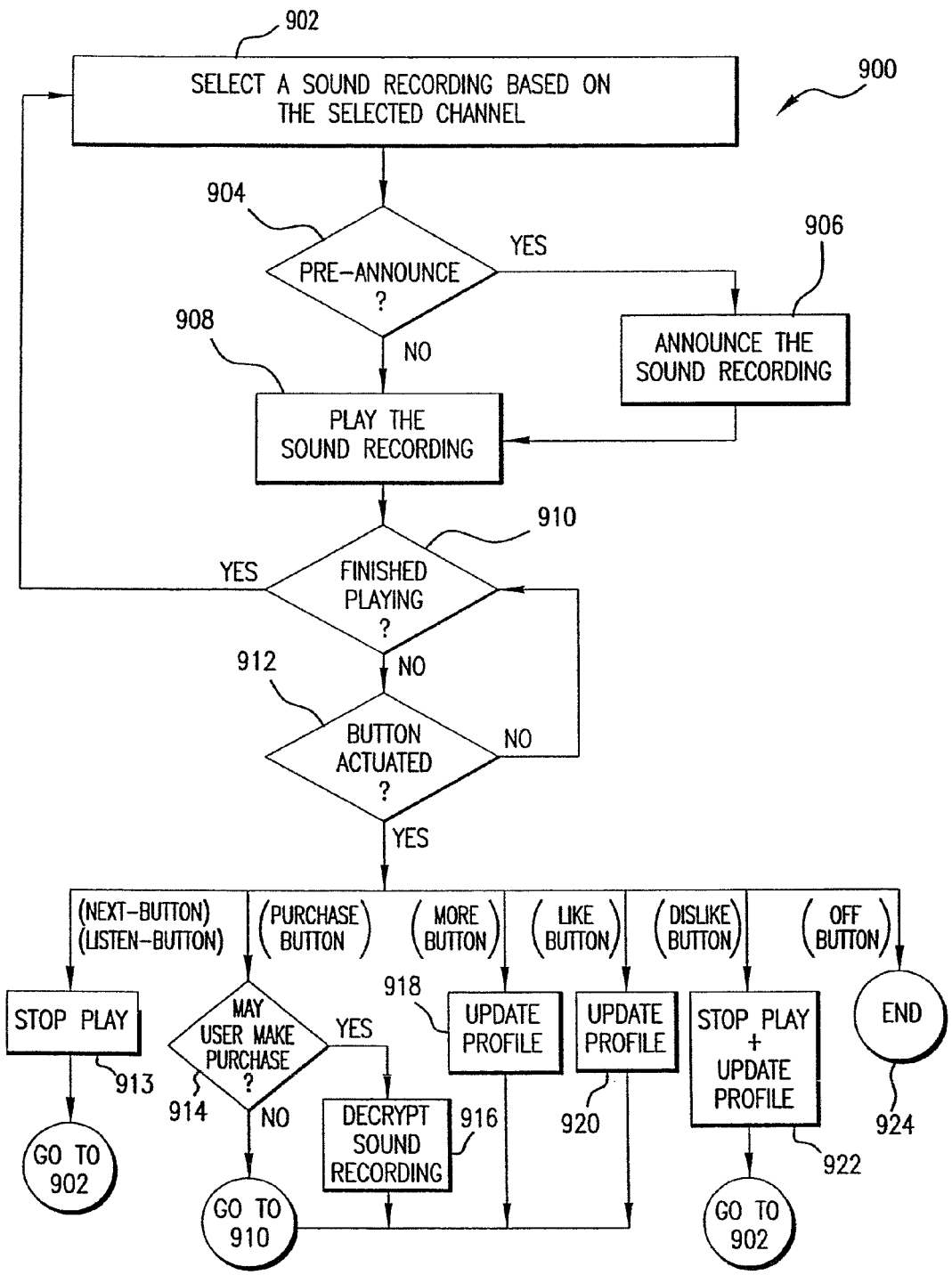
FIG. 9 is a flow chart illustrating a process, according to one embodiment, performed by device 202 in response to user 110 selecting to listen to an available, active channel.

FIG. 9 is a flow chart illustrating a process 900 performed by device 202 in response to user 110 selecting to listen to an available, active channel. Process 900 begins in step 902, where device 202 selects a sound recording based on the channel selected by user 110. In one embodiment, in addition to the selection of the sound recording being based on the channel selected by user 110, the selection is also based on one or more provisions of a statute, regulation, or contract (e.g., the DMCA). More specifically, in one embodiment, the audio system may select and play sound recordings for user 110 in such a manner that the use of the audio system by user 110 falls within a statutory compulsory license provision(s).

In an embodiment where the selected sound recording is in local sound recording library 216, the selected sound recording is retrieved from storage device 214, otherwise the selected sound recording may be transmitted from server 280 to device 202.

In step 904, device 202 then determines whether it can pre-announce the sound recording. Pre-announce means to audibly and/or visually inform user 110 of the title and artist of the selected sound recording prior to reproducing the sound recording for user 110. If it can pre-announce the sound recording it may be allowed to pre-announce it (step 906), otherwise control passes to step 908.

Preferably, if the selected sound recording is a song or other type of music, device 202 can not pre-announce the sound recording, unless so doing does not "violate" a law (statute or regulation) or contract. By violate we mean not conforming to one or more provisions of a statute or regulation or contract. Thus, for example, to ensure that device 202 does not violate the DMCA, device 202 might limit pre-announcements to only those music sound recordings that are owned by user 110. In one embodiment, device 202 determines which sound recordings that are owned by user 110 by examining library catalogue 217, which, as mentioned earlier, keeps track of which songs in library 216 are owned by user 110.

In step 908, device 202 plays the selected sound recording for user 110 to hear. While the sound recording is being reproduced for user 110, device 202 performs steps 910-924. In step 910, device 202 determines whether the sound recording selected in step 902 is finished playing. If it is, control passes back to step 902, otherwise control passes to step 912.

In step 912, device 202 determines whether user 110 has selected one of the buttons 802-810 or has selected off-button 609 or has selected to listen to a new audio channel. If no button is activated and if user 110 hasn't selected to listen to a new audio channel, control passes back to step 910, otherwise control passes to step 913 (next-button activated 802 or user 110 has selected to listen to a new audio channel), step 914 (purchase-button 804 activated), step 918 (more-button 806 activated), step 920 (like-button 808 activated), step 922 (dislike-button 810 activated), or step 924 (off-button 609 activated).

If user 110 selects next-button 802 or user 110 selects to listen to a different audio channel (e.g., user 110 selects a new audio channel from box 602 and then activates listen-button 603), device 202 stops reproducing the current sound recording (step 913). Control then passes back to step 902 where another sound recording is selected based on the currently selected audio channel.

In one embodiment, user 10's use of next-button 802 may be limited. For example, in one embodiment, user 110 may only activate next-button 802 a predetermined number of times in any given predetermined time interval. If user 110's activation of next-button 802 causes this limit to be exceeded, then device 202 will not skip to the next sound recording in response to the activation, as it normally would. A reason for this feature is to ensure that the set of sound recordings that are played for user 110 do not violate the DMCA.

If user 110 selects purchase-button 804, user 110 wants to purchase a copy of the sound recording that is currently being played. In one embodiment, after user 110 selects purchase-button 804, device 202 communicates with a remote server to verify that the user is qualified to make the purchase (e.g., does the user have enough money is his or her account) (step 914). If device 202 determines that user may purchase the sound recording that was playing when purchase-button 804 was activated, control passes to step 916, otherwise control passes back to step 910. In step 916, device 202 may create a decrypted copy of the sound recording for user 110 to listen to whenever the user so desires. That is, device 202 may allow user 110 to listen to any one of the sound recordings that user 110 has purchased at anytime.

If user 110 activates more-button 806, user 110 wants to hear more sound recordings that are like the current sound recording being played. In response to activation of more-button 806, device 202 updates appropriately the profile 219 of the currently selected audio channel (step 918). If the profile 219 is stored in storage device 214, device 202 updates the profile 219 directly. Otherwise, if the profile 219 is stored on server 280, device 202 transmits an update profile message to server 280. In this case, the update profile message indicates that user 110 selected more-button 806 and contains a sound recording identifier that identifies the current sound recording being reproduced. In one embodiment, whenever profile 219 is updated, a new playlist 218 and/or wanted list 215 corresponding to the selected audio channel is generated and stored in storage device 214.

If user 110 activates like-button 808, user 110 wants to add the sound recording being played to his or her list of most favorite sound recordings (e.g., to favorite sound recordings table 304). In response to activation of like-button 808, device 202 updates appropriately the profile 219 of the currently playing audio channel (step 920). If the profile 219 is stored in storage device 214, device 202 updates the profile 219 directly. Otherwise, if the profile 219 is stored on server 280, device 202 transmits an update profile message to server 280. In this case, the update profile message indicates that user 110 selected like-button 808 and contains a sound recording identifier that identifies the current sound recording being reproduced.

Advantageously, in one embodiment, user 110 can indicate the degree to which he or she likes the sound recording that is playing. In one embodiment, user 110 indicates the degree to which he or she likes the sound recording that is playing by the number of times user 110 activates like-button 808 while the song is playing. For example, if user 110 likes the song that is playing a great deal, user 110 might activate like-button 808 three times in quick succession. Whereas, if user 110 likes the song that is playing, but only likes it a small degree compared to other songs he or she likes, user 110 might activate like-button 808 only once while the song is playing. The appropriate profile 219 is updated to reflect the degree to which the user likes the song that is playing. In another embodiment, user 110 indicates the degree to which he or she likes the sound recording that is playing by the length of time that user 110 holds down like-button 808. For example, if user 110 likes the song that is playing a great deal, user 110 would hold down the like-button 808 for a longer period of time than if user 110 only liked the playing song a little bit.

If user 110 doesn't want to hear the current sound recording ever again, he or she can select dislike-button 810. In response to activation of dislike-button 810, device 202 stops reproducing the current sound recording and updates appropriately the profile 219 of the currently playing audio channel (step 922). That is, device 202, at a minimum, adds the playing sound recording the user 110's list of least favorite sound recordings. If the profile 219 is stored in storage device 214, device 202 updates the profile 219 directly. Otherwise, if profile 219 is stored on server 280, device 202 transmits an update profile message to server 280. In this case, the update profile message indicates that user 110 selected dislike-button 810 and contains a sound recording identifier that identifies the current sound recording being reproduced. After step 922, control passes back to step 902 where another sound recording is selected and reproduced.

In one embodiment, user 110's use of dislike-button 810 may be limited. For example, user 110 may only activate dislike-button a predetermined number of times in any given predetermined time interval. If user 110's activation of dislike button causes this limit to be exceeded, then device 202 will not skip to the next sound recording in response to the activation, as it otherwise might. A reason for this feature could be to ensure that the set of sound recordings that are played for user 110 do not violate (i.e., conforms to) the DMCA.

When user activates off-button 609, process 900 ends (step 924).

Preferably, in performing step 902, the sound recordings may be selected "intelligently." For example, the sound recordings are selected such that the resulting set of selected sound recordings "matches" the profile of the selected audio channel. That is, if the audio channel is specified as follows: 40% Rock genre (30% Hard Rock and 10% Light Rock) and 60% Alternative genre, then the resulting set of selected sound recordings should closely conform to this specification.

Additionally, the sound recordings can be selected to not only match the profile of the audio channel, but also to conform to any statutory, regulatory or contractual requirement that governs the broadcasting of sound recordings. For example, if there is a requirement that all songs not owned by the listener are not allowed to be played more than once within a certain time interval (e.g., you can't play a song more than once within any given hour), then device 202 will be configured so as not to violate this requirement when it selects songs for reproduction in step 902. In short, device 202 can be programmed to ensure that device 202 does not violate any statutory, regulatory or contractual requirement, such as the DMCA.

As an additional feature, user 110 may have no direct control over which songs are selected in step 902. All that user 110 might directly control is an audio channel's profile, which merely gives user 110 indirect control over which songs are selected in step 902. That is, by having direct control over an audio channel's profile, user 110 may influence which songs are selected in step 902, but can not directly control which songs will get selected. Further, user 110 has no way to determine which songs will get selected. With these features, listening to an audio channel may be just like listening to a conventional radio station in terms of not knowing what is going to be selected next to be played.

Playlists

Preferably, to facilitate the selection of songs in step 902, there exists a personalized playlist 218 for each active audio channel defined within system 200. That is, in one embodiment, each active audio channel has an associated playlist 218. As shown in FIG. 2, playlists 218 can be stored either within consumer device 202 or on server 280.

A personalized playlist 218 includes a list of sound recording identifiers that identify sound recordings that have a high probability of being enjoyed by user 110. The sound recordings identified in a playlist 218 may have a high probability of being enjoyed by user 110 because, at the least, a majority of the identified sound recordings "match" (or "fit") a profile 219 belonging to the audio channel to which the playlist is associated and user 110 has control over the contents of the profile. In one embodiment, all of the identified sound recordings match the profile 219. A playlist 218 "matches" or "fits" a profile 219 if at least a majority of the sound recordings identified by the playlist match or fit the profile 219.

Preferably, user 110 can not directly access any playlist 218. That is, user 110 should not be allowed to view or otherwise determine the contents of any of the playlists 218. In one embodiment, this is accomplished by encrypting each playlist 218. Thus, in a preferred embodiment, software program 250 may have the key to decrypt a playlist but user 110 does not. At least one exception to this rule is that user 110 may have direct access to a playlist 218 if user 110 owns a copy of each sound recording identified in the playlist 218.

FIG. 4 illustrates the information contained in an exemplary playlist 218. As shown in FIG. 4, playlist 218 contains a list of sound recording identifies. Each sound recording identifier uniquely identifies a sound recording. As mentioned above, in one embodiment, each sound recording identifier uniquely identifies a sound recording that matches the profile 219 of the audio channel to which the playlist is associated. A sound recording can be any type of audio recording, such as a music recording, a song recording, or a recording of an audio news segment. Meta-data is preferably associated with each sound recording identifier. Preferably, the meta-data includes such information as the name of the artist(s) who created the sound recording, the name of an album on which the sound recording is recorded, the title of the sound recording, etc. Meta-data associated with a particular sound recording may be displayed to user 110 in display box 850 when the particular sound recording is played by device 220.

In one embodiment, a playlist generator 288 is provided to create for each active audio channel a playlist 218 that matches the active audio channel. In other embodiments, the playlists 218 may be created by a professional audio programmer or combination of a playlist generator 288 and programmer. Playlist generator 288 may be installed in device 202 or in an external computing device, such as server 280 or PC 299, and is preferably implemented in software. As one skilled in the art will appreciate, the operation of playlist generator is same whether it is installed in server 280, PC 299 or other external computing device, and thus only the embodiments where playlist generator is stored in server 280 or device 202 are described, for the sake of brevity.

In generating a playlist 218 that is associated with a particular audio channel, playlist generator uses the particular audio channel's profile 219. Thus, if playlist generator is installed in server 280 and not on device 202, and the profiles 219 are stored in device 202 but not on server 280, then before playlist generator 288 can generate a playlist 218 to be associated with a given active audio channel, device 202 must first transmit to server 280 the audio channel's profile information 219. In this embodiment, after the playlist 218 is generated, server 280 transmits the playlist 218 to device 202.

In one embodiment where a local sound recording library 216 is stored in storage unit 214, each playlist 218 may be constructed so as to contain only sound recording identifiers that identify a sound recording that is in library 216. Thus, in this embodiment, playlist generator 288 uses the information in catalogue 217 in conjunction with a profile 219 to create a playlist 218. Consequently, if playlist generator is installed in server 280 and not on device 202, then before playlist generator 288 can generate a playlist 218, device 202 must first transmit to server 280 library catalogue 217.

Each playlist 218 created by playlist generator 288 preferably matches the profile that is used in creating the playlist. So, for example, if playlist generator 288 creates a playlist 218 using a profile that indicates that artist ABC is one of the user's least favorite artists, then playlist 218 might not contain any sound recordings from artist ABC. Similarly, for example, if the profile indicates that one of user 110's favorite songs is "Let it Be" by the Beatles, then this song may be included in the playlist 218. Also, as anyone skilled in the art can appreciate, a profile 219 may include preferences for other characteristics, such as tempo.

As an additional feature, playlist generator 288 or the programmer that creates playlist 218 can create the playlist 218 so that for each sound recording identified in the playlist 218 there is provided an indication of whether or not the identified sound recording may be pre-announced.

Audio Channel Profiles 219

Each active audio channel has as an associated channel profile 219. As discussed above, the profile 219 belonging to an audio channel may be used, in one embodiment, to create the playlist 218 associated with the audio channel. In certain embodiments, the channel profiles 219 may be stored in storage device 214. In other embodiments, profiles 219 may be stored on server 280.

Figure 3:
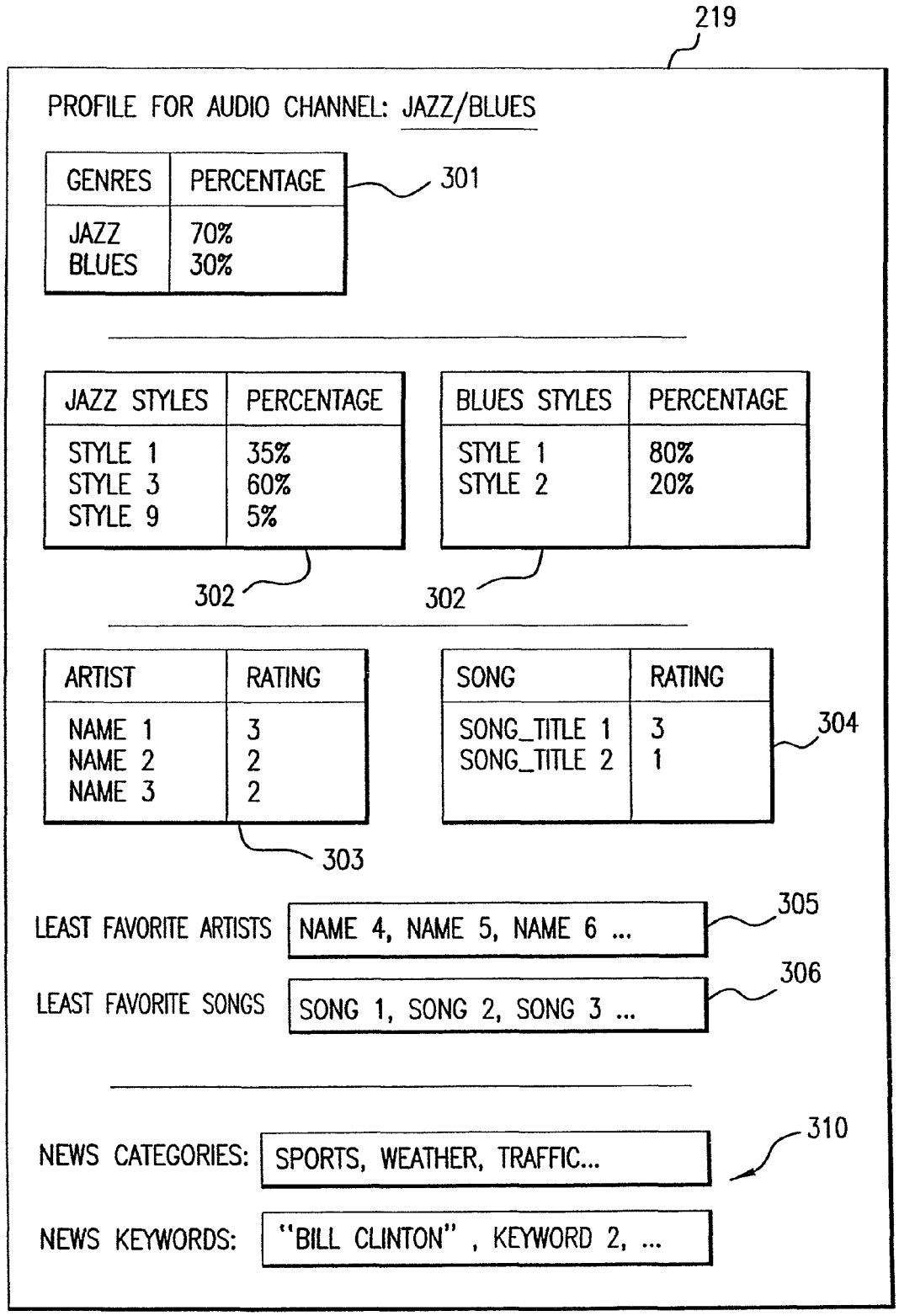
FIG. 3 is an illustration of a channel profile, according to one embodiment.

Referring to FIG. 3, an exemplary audio channel profile 219 is illustrated. The profile 219 illustrated in FIG. 3 belongs to a music/information channel, as opposed to an all music channel or an all information channel. Channel profile 219 contains channel specification information for the music/information channel.

As shown in FIG. 3, the channel specification information, according to one embodiment, may include a table of one or more music genres ("genre-table" 301) with corresponding genre percentages, and, for each listed genre, it may include a table of styles associated with the genre ("style tables" 302) and corresponding style percentages. Profile 219 additionally may include a favorite artists table 303, a favorite sound recording table 304, a least favorite artists list 305, and a least favorite sound recordings list 306. Favorite artists table 303 includes two columns. One column is for identifying an artist and the other column contains an integer value between and including the numbers 1 and 3. This column represents the degree to which user 110 likes the corresponding artist. A value of 1 means user 110 likes the corresponding artist only a very little, while a value of 3 means user 110 likes the corresponding artist very much. A value of 2 means user 110 likes the corresponding artist more than a just a little, but not very much.

Likewise, the favorite sound recordings table includes two columns, one column for identifying a sound recording and one column for indicating the degree to which user 110 likes a particular sound recording in the table. Because, in this embodiment, profile 219 belongs to a music/information channel, profile 219 also includes news item categories and keywords 310. The creation of channel profiles are described further below with reference to FIGS. 15-17.

Those skilled in the art will appreciate that the present invention is not limited to any particular design of profile 219. As is appreciated by those skilled in the art, all that is required is that profile 219 be designed to contain profile information from which a "personalized" playlist can be generated. That is, profiles 219, at a minimum, contain information corresponding to, or related to, user 110's sound recording preferences. In short, the profile 219 shown in FIG. 3 is used merely to illustrate an embodiment of the invention and not to limit the invention.

Wanted Lists

In certain embodiments, each active audio channel defined within device 202 has an associated wanted list 215 that is stored in storage device 214. As it's name implies, a wanted list 215 contains a list of wanted items. In this system, the wanted items are copies of sound recordings.

FIG. 5 illustrates the information contained in an exemplary wanted list 215. As illustrated in FIG. 5, wanted list 215 contains a list of sound recording identifiers and an indicator for each listed sound recording that indicates whether the sound recording is in library 216 or not. At the least, a majority of the listed sound recording identifiers identifies a sound recording that matches the profile belonging to the audio channel to which the wanted list 215 is associated. However, it is preferred that each listed sound recording identifier identifies a sound recording that matches the profile belonging to the audio channel to which the wanted list 215 is associated. Also as illustrated in FIG. 5, a variety of information may be associated with each sound recording identifier, such as: the music genre to which the sound recording belongs, the style categories within the genre(s) to which the sound recording belongs, and meta-data concerning the sound recording. The meta-data may include such information as the artists name, album name, song title, etc.

Wanted lists 215 may be created by a list generator 287 or by a system operator. Like playlist generator 288, list generator 287 can be installed in device 202 or in an external computing device, such as server 280 or PC 299, and is preferably implemented in software. For the sake of brevity, only the embodiments where list generator 287 is stored in server 280 or device 202 is described.

In creating a wanted list 215, list generator 287 may use the profile information stored in the profile 219 belonging to audio channel with which the list 215 is intended to be associated. Thus, if list generator 287 is installed in server 280 and not on local device 202, and the profiles 219 are stored in local device 219 but not on server 280, then before list generator 287 can generate a wanted list 215 to be associated with a given active audio channel, device 202 must first transmit to server 280 the given audio channel's profile information 219.

Also, if list generator 287 is installed on server 280 and not device 202, then after list generator 287 creates the list 215, the list 215 is transmitted by server 280 to device 202.

In one embodiment, wanted list 215 may not be accessed directly by user 110. That is, in one embodiment, user 110 may not be allowed to view or otherwise determine the contents of any of the wanted lists 215. This may be accomplished by encrypting each wanted list 215 so that only software program 250 can decrypt the wanted lists.

A playlist 218 associated with a given audio channel and stored in storage unit 214 and a wanted list 215 associated with the same audio channel are similar in that both the playlist 218 and the wanted list 215 contain one or more sound recording identifiers that identify a sound recording that fits the profile of the audio channel to which they are associated. They are different, however, in that a playlist 218 preferably does not contain any sound recording identifiers that identify a sound recording that is not in library 216, whereas wanted list 215 is not so constrained. Additionally, in many embodiments, a wanted list 215 may contain a much longer list of sound recording identifiers than does a playlist 218.

Details of the Operation of an Audio Channel

FIGS. 10-14 and 26-28 illustrate various different processes 1000, 1100, 1200, 1300, 1400, 2600, 2700 and 2800, respectively, that are performed by device 202 in response to user 110 selecting to listen to an available, active audio channel.

Figure 10:
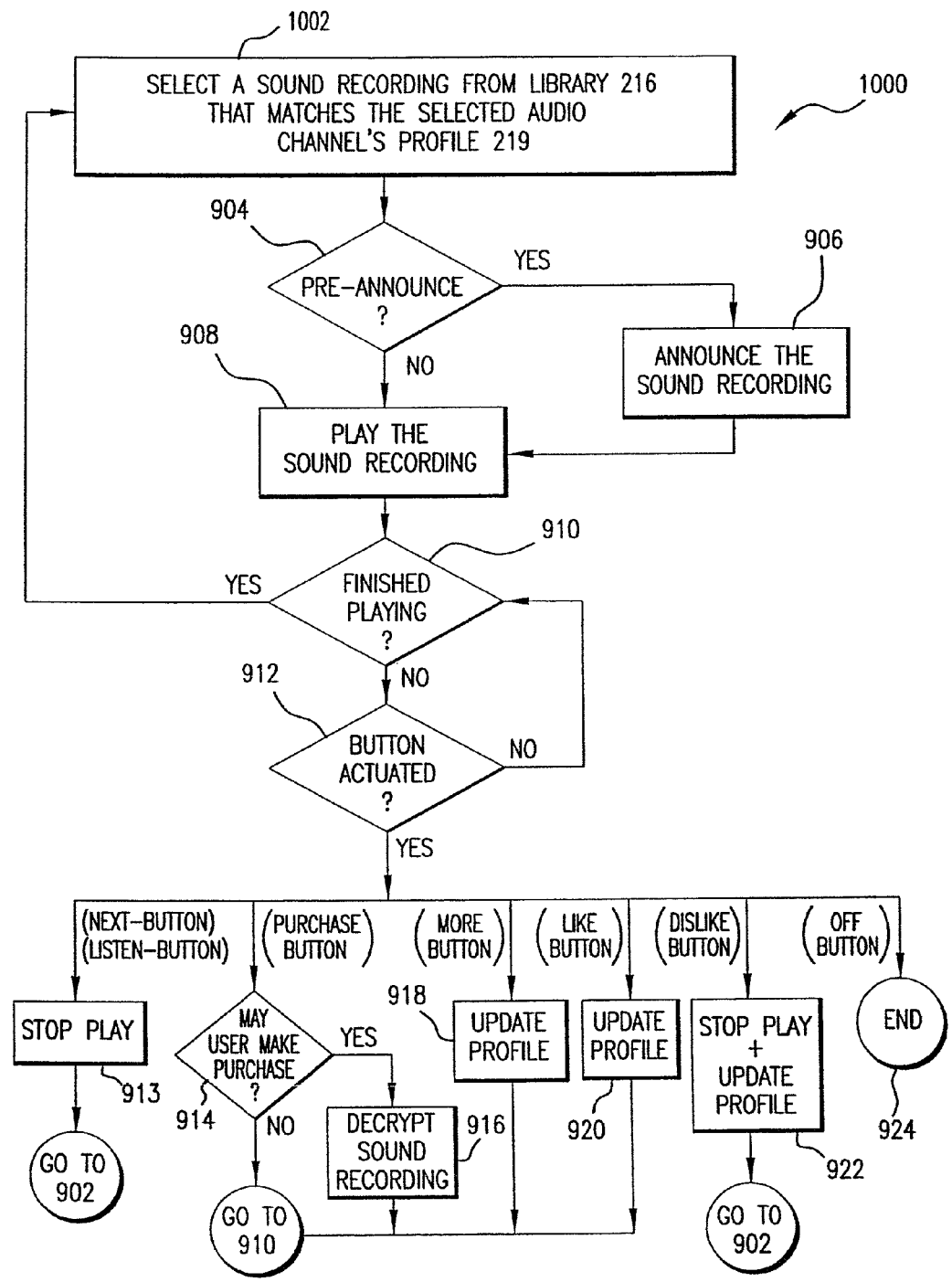
FIGS. 10-14 and FIGS. 26-28 illustrate processes that are performed by a consumer device in response to a user of the device selecting to listen to an available, active audio channel.

Referring to FIG. 10, process 1000 is preferably used in the embodiment where a profile 219 belonging to the selected audio channel and a local sound recording library 216 is stored in storage device 214, but neither a wanted list 215 nor a playlist 218 corresponding to the selected audio channel is stored in storage device 214.

Process 1000 is identical to process 900, with the exception of step 1002. In step 1002, device 202 selects a sound recording from library 216 that fits the profile 219 of the selected audio channel. In one embodiment, library catalogue 217 is examined to select a sound recording from library 216 that fits the profile 219. As illustrated in FIG. 25, in one embodiment, for each sound recording in library 216, library catalogue maintains a record of the genre(s) and style(s) to which the sound recording belongs. This genre and/or style information is used to by device 202 in determining whether a particular sound recording in library 216 matches the profile 219.

Preferably, in performing step 1002, the sound recordings are selected "intelligently." For example, the sound recordings are selected such that the resulting set of selected sound recordings does not violate any statutory, regulatory or contractual requirement.

Figure 11:
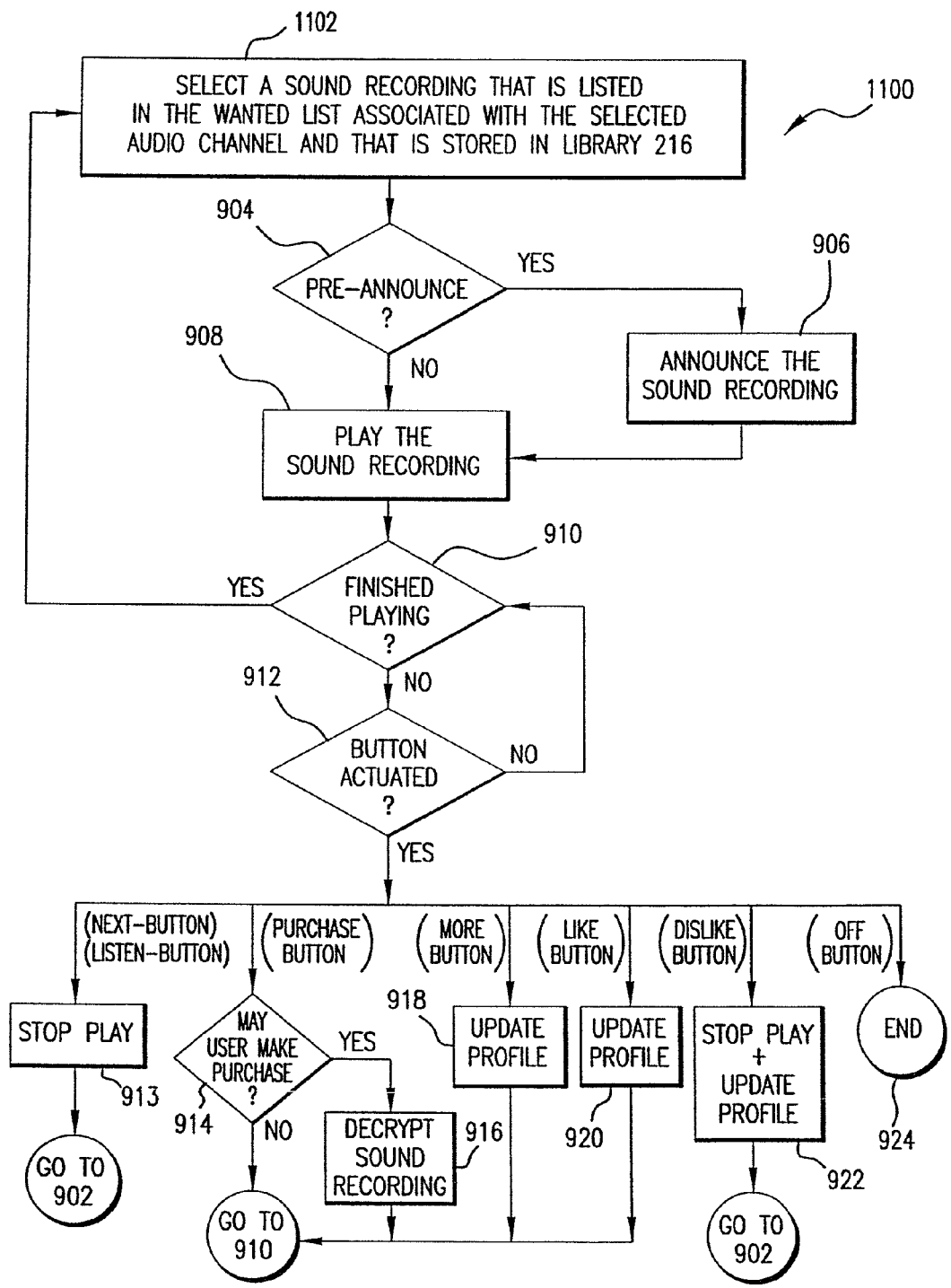

Referring to FIG. 11, process 1100 is preferably used in the embodiment where a wanted list 215 corresponding to the selected audio channel is stored in storage device 214, but a playlist 218 corresponding to the selected audio channel is not stored in storage device 214. As described earlier, a wanted list 215 contains, among other things, a list of sound recording identifiers that match the profile 219 belonging to the selected audio channel. Wanted list 215 is preferably created when the audio channel to which it is associated is activated by user 110.

Like process 1000, process 1100 is identical to process 900, with the exception of step 1102. In step 1102, device 202 selects a sound recording by choosing a sound recording that (1) is identified by a sound recording identifier that is listed in the wanted list 215 that is associated with the selected audio channel and (2) is stored in library 216. Preferably, as with step 1002 of process 1000, in performing step 1102, the sound recordings are selected intelligently.

Figure 12:
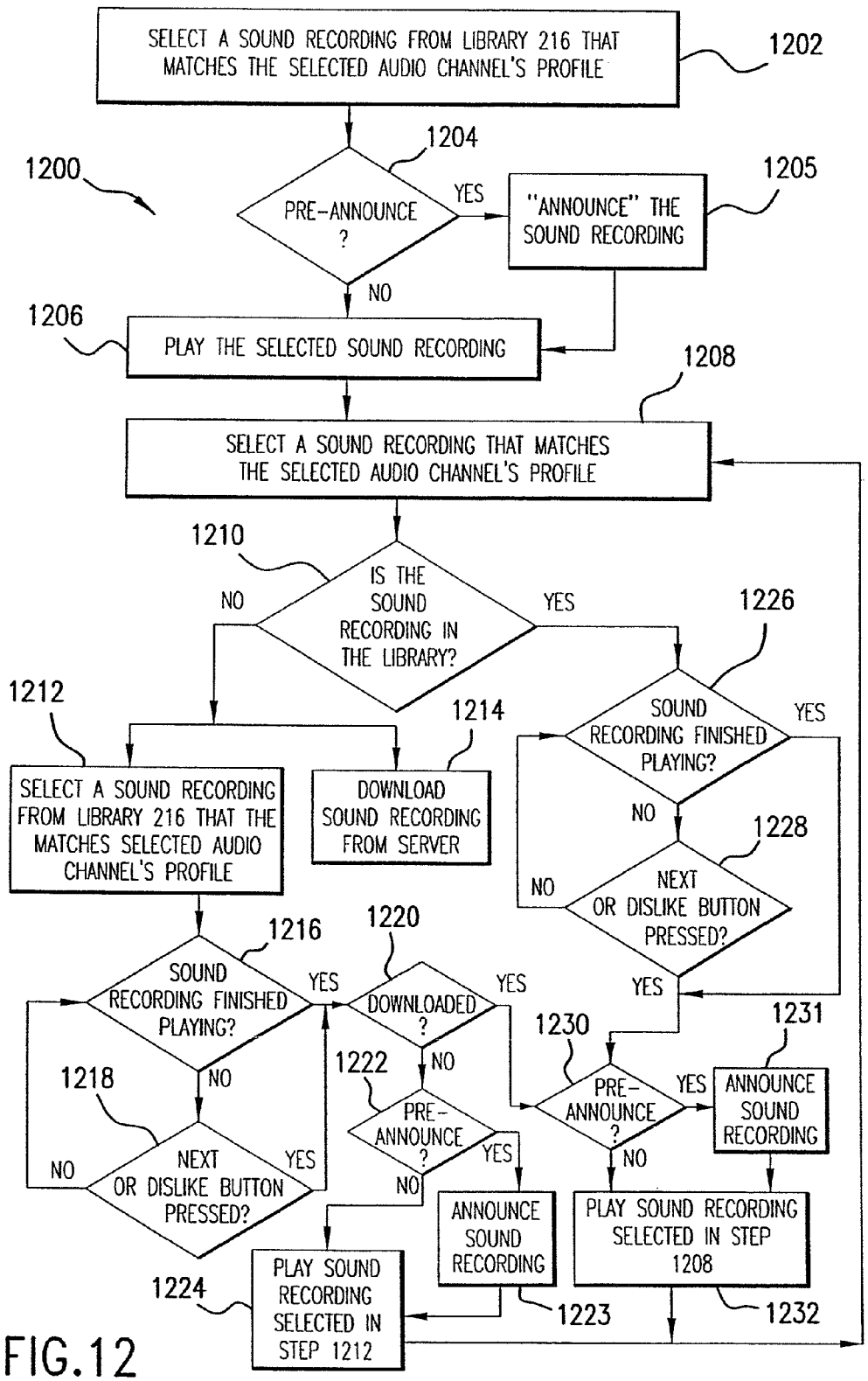

Referring to FIG. 12, process 1200 is preferably used in the embodiment where a profile 219 belonging to the selected audio channel is stored in storage device 214, but neither a wanted list 215 nor a playlist 218 corresponding to the selected audio channel is stored in storage device 214.

Process 1200 begins in step 1202 where device 202 selects a sound recording from library 216 that matches the selected audio channel's profile. After step 1202 control passes to step 1204, where device 202 determines whether it may pre-announce the selected sound recording. If it may, control passes to step 1205, otherwise control passes to step 1206. In step 1205 the selected sound recording is audibly and/or visually announced to user 110. After step 1205, control passes to step 1206. In step 1206, device 202 begins playing the selected sound recording.

While the selected sound recording is being played for the listener, device 202 selects another sound recording that matches the selected audio channel's profile (step 1208). Next, a determination is made as to whether the sound recording selected in step 1208 is part of the sound recording library (step 1210). If the selected sound recording is part of the sound recording library, control passes to step 1226, otherwise control passes to steps 1212 and 1214.

In step 1226 a determination is made as to whether the sound recording currently being reproduced is finished. If it is finished, device 202 determines whether it may pre-announce the sound recording selected in step 1208 (step 1230). If it may, control passes to step 1231, otherwise control passes to step 1232. In step 1231 the sound recording selected in step 1208 is audibly and/or visually announced to user 110. After step 1231, control passes to step 1232. In step 1232, device 202 begins playing the sound recording selected in step 1208.

If the current sound recording is not finished, device 202 determines whether next-button 802 or dislike-button 810 were selected by user 110 (step 1228). If either of those buttons were selected, then control passes to step 1226.

In step 1214, device 202 automatically downloads the sound recording selected in step 1208 from server 280, stores the recording onto storage device 214, and adds the recording to local sound recording library 216. Preferably, the downloaded recording is encrypted (either by the server before it transmits the recording to device 202 or by device 202 after it receives the recording). In this way, because the sound recording is encrypted, only authorized people or systems can directly access the recording. Preferably, user 110 is not authorized to directly access the sound recording. That is, device 202 does not give user 110 the capability to play the sound recording whenever user 110 so desires. It is also preferred that the sound recording be compressed before it is transmitted to save time in downloading the sound recording.

In step 1212, device 202 selects a sound recording from library 216 that matches the selected audio channel's profile. Preferably, the sound recording selected in step 1212 is very similar in genre and style to the sound recording selected in step 1208. Next, device 202 determines whether the sound recording currently being played is finished (step 1216). If it is finished, control passes to step 1220, otherwise control passes to step 1218.

In step 1218, device 202 determines whether next-button 802 or dislike-button 810 were selected by user 110. If either of those buttons were selected, then control proceeds to step 1220, otherwise the process returns to step 1216.

In step 1220, device 202 determines whether the sound recording that is being downloaded in step 1214 is ready to be played. That is, it determines, among other things, whether a sufficient amount of the sound recording has been successfully downloaded and stored onto storage device 214. If the sound recording is ready to be played, then control passes to step 1230, otherwise control passes to step 1222. In step 1222, device 202 determines whether it may pre-announce the sound recording selected in step 1212. If it may, control passes to step 1223, otherwise control passes to step 1224. In step 1223 the sound recording selected in step 1212 is audibly and/or visually announced to user 110. After step 1223, control passes to step 1224. In step 1224, device 202 begins playing the sound recording selected in step 1212. After step 1224, control passes back to step 1208.

Figure 13:
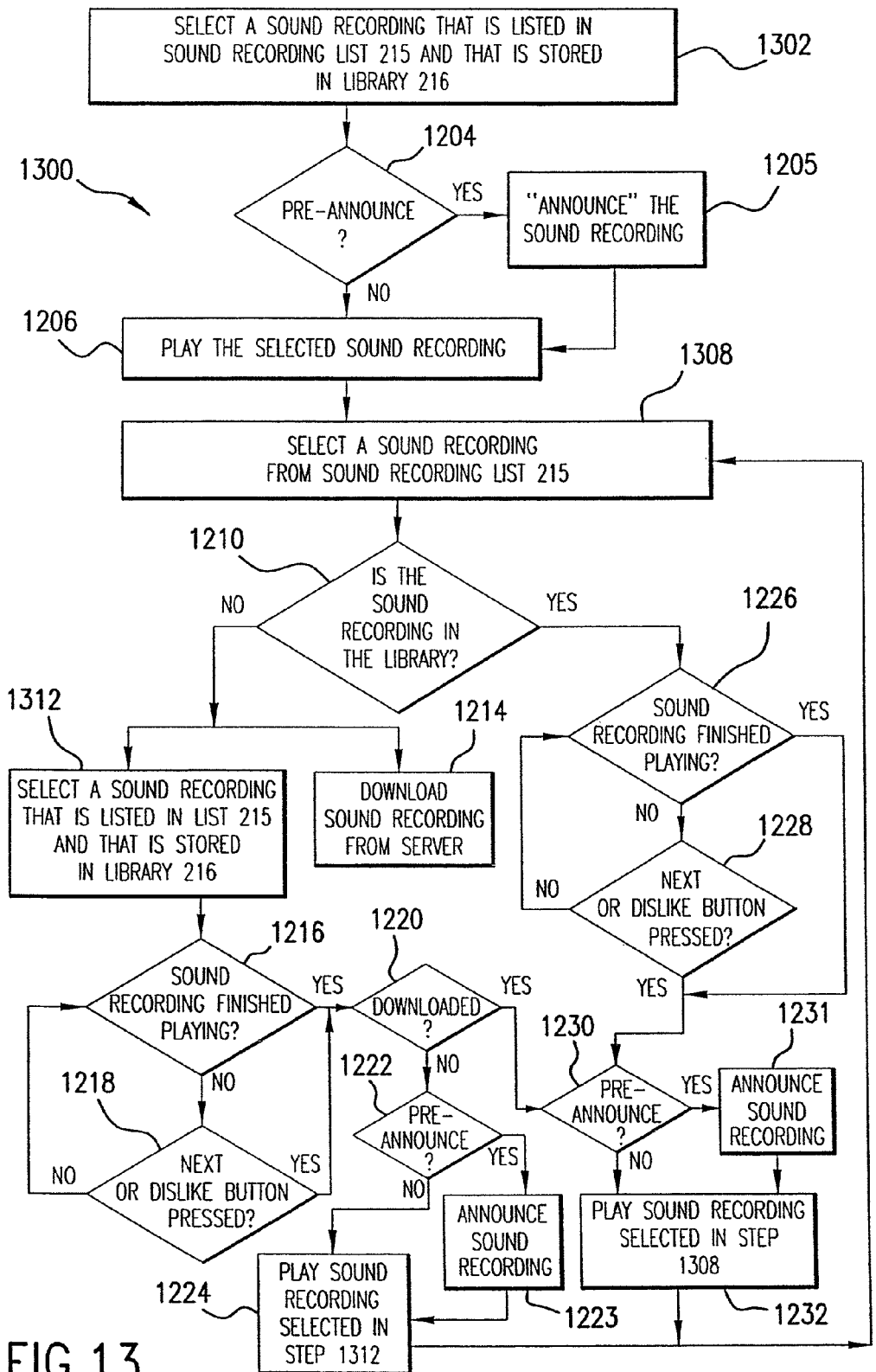

Referring to FIG. 13, process 1300 is preferably used in the embodiment where a wanted list 215 corresponding to the selected audio channel is stored in storage device 214, but a playlist 218 corresponding to the selected audio channel is not stored in storage device 214. Process 1300 is identical to process 1200, with the exception of steps 1302, 1308, and 1312. In step 1302, device 202 selects a sound recording that (1) is listed in the wanted list 215 that is associated with the selected audio channel and (2) is stored in library 216. In step 1308, device 202 selects a sound recording that is listed in the wanted list 215 that is associated with the selected audio channel. And in step 1312, device 202 selects a sound recording that (1) is listed in the wanted list 215 that is associated with the selected audio channel and (2) is stored in library 216.

In one embodiment, after device 202 performs step 1214, device 202 determines the next N sound recordings that are to be played and that are not stored in library 216 and downloads those N sound recordings (this could be done sequentially or all at one time or other ways). N can be any integer greater than or equal to 1. In this way, when a sound recording is selected to be played in step 1308, it is likely that the sound recording will be in library 216.

Although not shown as part of process 1200 or 1300, when either next-button 802 or dislike-button 810 are selected, device 202 ceases playing the currently playing sound recording. Additionally, if dislike-button 810 is selected, the profile of the currently selected audio channel is appropriately updated.

Also, although it is not shown in either process 1200 or process 1300, device 202 processes the more-button 806, purchase-button 804, like-button 808, and off-button 609 activation event in the same manner as was described with reference to process 900.

Figure 14:
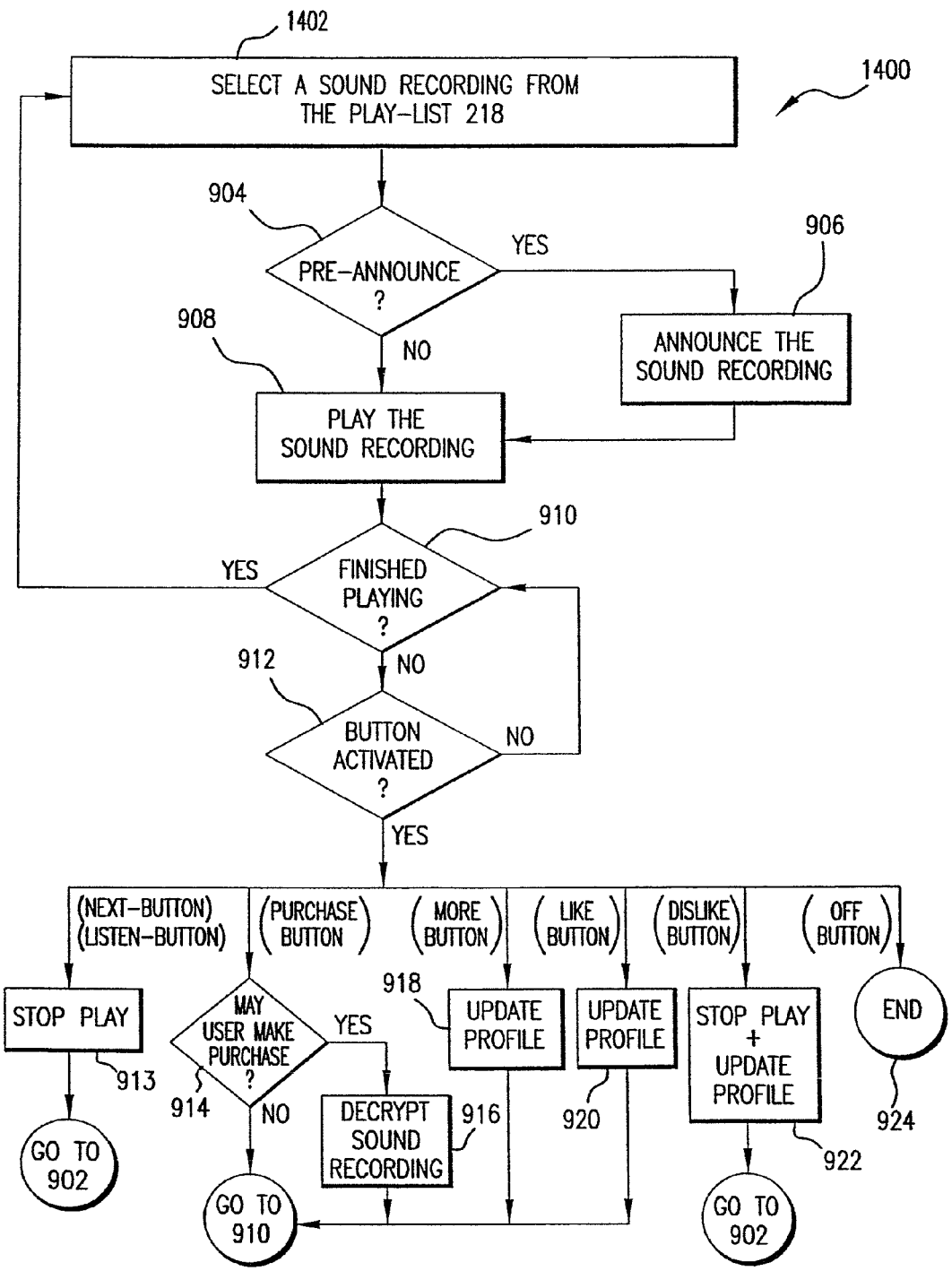

Referring to FIG. 14, process 1400 is preferably used in the embodiment where a local sound recording library 216 and a playlist 219 associated with the selected audio channel are stored in storage device 214, and the playlist 218 only lists sound recording identifiers that identify a sound recording stored in library 216. Process 1400 is identical to process 900, with the exception of step 1402. In step 1402, device 202 selects a sound recording that is listed in the playlist 218.

Preferably, in this embodiment, playlist 218 contains an ordered list of sound recordings having a beginning and end, and, in selecting a sound recording from the playlist 218, device 202 simply begins at the beginning of the playlist and selects the recordings in the order in which they are listed. Consequently, device 202 keeps track of the last sound recording that it selected so it knows the next sound recording to select. In one embodiment, when the last sound recording that device 202 selected is at or near the end of the playlist, device 202 will use playlist generator 288 to generate a new playlist 218. In another embodiment, a new playlist 218 is generated on a periodic basis (i.e., daily, weekly, . . . ). In still another embodiment, a new playlist 218 is generated for a given active audio channel whenever the active audio channel's profile is updated.

Preferably, playlist generator 288 uses the existing playlist 218, the profile 219 associated with the existing playlist 218, and library catalogue 217 to create a new playlist 218. Alternatively, if playlist generator 288 is installed in server 280 as opposed to in device 202, then device 202 may transmit to server 280 the existing playlist 218, the profile 219 associated with the existing playlist 218, and library catalogue 217 (if these items are not already stored on server 280). Playlist generator 288 installed on server 280 will then have the information necessary to create the new playlist. After the new playlist is created, it is transmitted from server 280 to device 202, where it is then stored in storage unit 214 and associated with the appropriate audio channel.

Regardless of where playlist generator 288 is installed, playlist generator 288 preferably creates only playlists that (1) conform to the DMCA or similar statute, regulation or contract and (2) matches the profile 219 of the audio channel with which the playlist 218 is associated.

Figure 26:
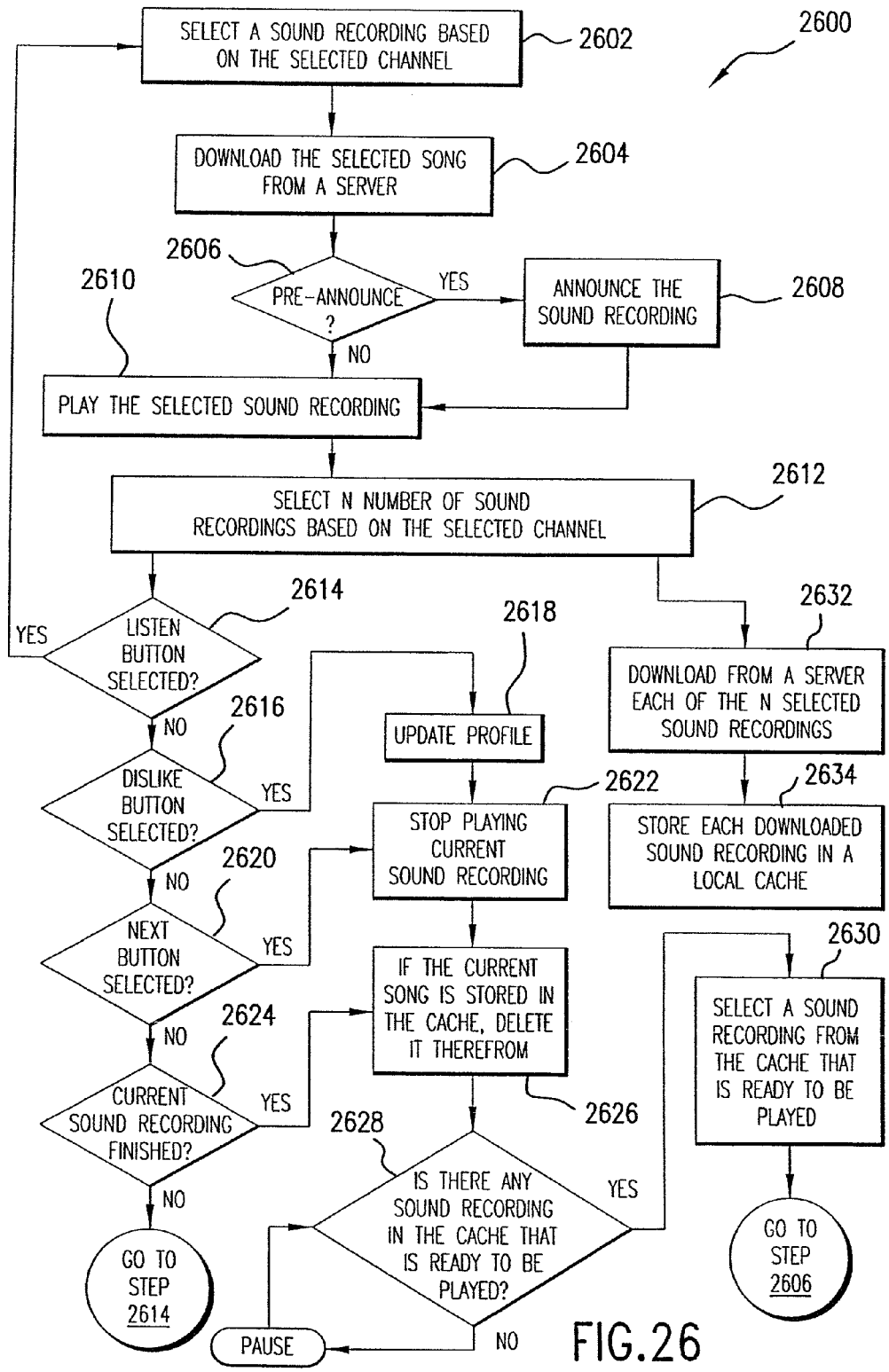

Referring to FIG. 26, process 2600 may be used in the embodiment where device 202 does not maintain a local sound recording library 216. Process 2600 begins in step 2602, where device 202 selects a sound recording based on the channel selected by user 110. This can be accomplished by either (A) choosing, from a given set of sound recordings, a sound recording that fits the profile of the selected audio channel, or (B) choosing a sound recording that is identified by a sound recording identifier that is listed in the wanted list 215 and/or playlist 218 that is associated with the selected audio channel. After step 2602, device 202 downloads the selected song from a remote server (e.g., server 280) (step 2604). After step 2604, control passes to step 2606.

In step 2606, device 202 determines whether it can pre-announce the most recently selected sound recording. If it can pre-announce the sound recording it will (step 2608), otherwise control passes to step 2610.

In step 2610, device 202 plays the most recently selected sound recording for user 110 to hear. Device 202 also selects N number of sound recordings based on the currently selected audio channel (step 2612), where N is an integer greater than or equal to 1. Preferably, N is determined by the amount of free space available in a local cache 269, which can be implemented using memory available within in data processing unit 212 (such as RAM) or which can be implemented using storage space available in storage device 214, as is illustrated in FIG. 2. While the sound recording is being reproduced for user 110, device 202 performs steps 2614-2630 in parallel with steps 2632-2634.

In step 2632, device 202 downloads the selected N sound recordings from a remote server 280. In step 2634, device 202 stores each downloaded sound recording in local cache 269.

In steps 2614-2624, device 202 determines whether listen-button 603 has been selected, whether dislike-button 810 has been selected, whether next-button 802 has been selected, and whether the last sound recording selected to be played (i.e., the "current" sound recording) is finished playing, respectively. If listen button 603 was selected, control passes back to step 2602 and, preferably, the local cache is cleared (i.e., all sound recordings stored in the cache are deleted). If dislike-button 810 was selected, control passes to step 2618, where device 202 updates appropriately the profile associated with the selected audio channel, stops playing the current sound recording, and may delete the current sound recording from the cache 269 if it is stored in the cache 269 (steps 2618, 2622, and 2626, respectively). If next-button 802 was selected, control passes to step 2622, and if the current sound recording is finished playing, control passes to step 2626. After step 2626, control passes to step 2628.

In step 2628, device 202 determines whether there are any sound recordings in the local cache 269 that are ready to be played. If not, device pauses and then returns to step 2628, otherwise control passes to step 2630. In step 2630, device 202 selects a sound recording from local cache 269 that is ready to be played and control then passes back to step 2606.

Figure 27:
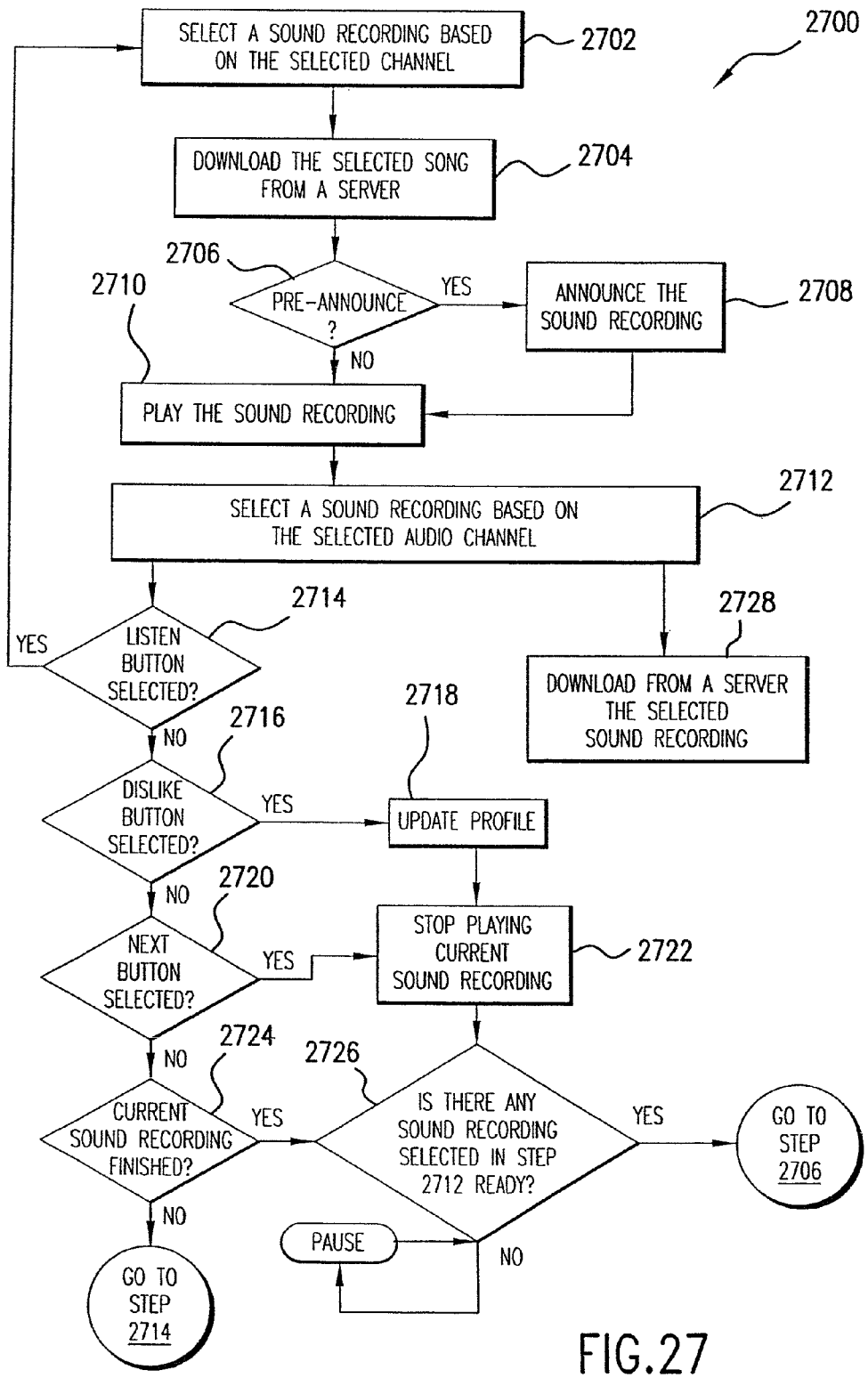

Referring to FIG. 27, process 2700 may be used in the embodiment where device 202 does not maintain a local sound recording library 216. Process 2700 begins in step 2702, where device 202 selects a sound recording based on the channel selected by user 110. This can be accomplished by either (A) choosing, from a given set of sound recordings, a sound recording that fits the profile of the selected audio channel, or (B) choosing a sound recording that is identified by a sound recording identifier that is listed in the wanted list 215 and/or playlist 218 that is associated with the selected audio channel. After step 2702, device 202 downloads the selected song from a remote server (e.g., server 280) (step 2604). After step 2704, control passes to step 2706.

In step 2706, device 202 determines whether it can pre-announce the most recently selected sound recording. If it can pre-announce the sound recording it will (step 2708), otherwise control passes to step 2710.

In step 2710, device 202 plays the most recently selected sound recording for user 110 to hear. Device 202 also selects another sound recording based on the currently selected audio channel (step 2712).

While the sound recording is being reproduced for user 110, device 202 performs steps 2714-2726 in parallel with step 2728. In step 2728, device 202 downloads the most recently selected sound recording (i.e., the sound recording selected in step 2712) from a remote server 280.

In steps 2714-2724, device 202 determines whether listen-button 603 has been selected, whether dislike-button 810 has been selected, whether next-button 802 has been selected, and whether the last sound recording selected to be played (i.e., the "current" sound recording) is finished playing, respectively. If listen-button 603 was selected, control passes back to step 2702 and. If dislike-button 810 was selected, control passes to step 2718, where device 202 updates appropriately the profile 219 associated with the selected audio channel, and stops playing the current sound recording (steps 2718 and 2722). If next-button 802 was selected, control passes to step 2722, and if the current sound recording is finished playing, control passes to step 2726.

In step 2726, device 202 determines whether the most recently selected sound recording is ready to be played. If it is not ready, device pauses and then returns to step 2726, otherwise control then passes back to step 2706.

Although it is not shown in either process 2600 or process 2700, device 202 processes the more-button 806, purchase-button 804, like-button 808, and off-button 609 activation event in the same manner as was described with reference to process 900.

Figure 28:
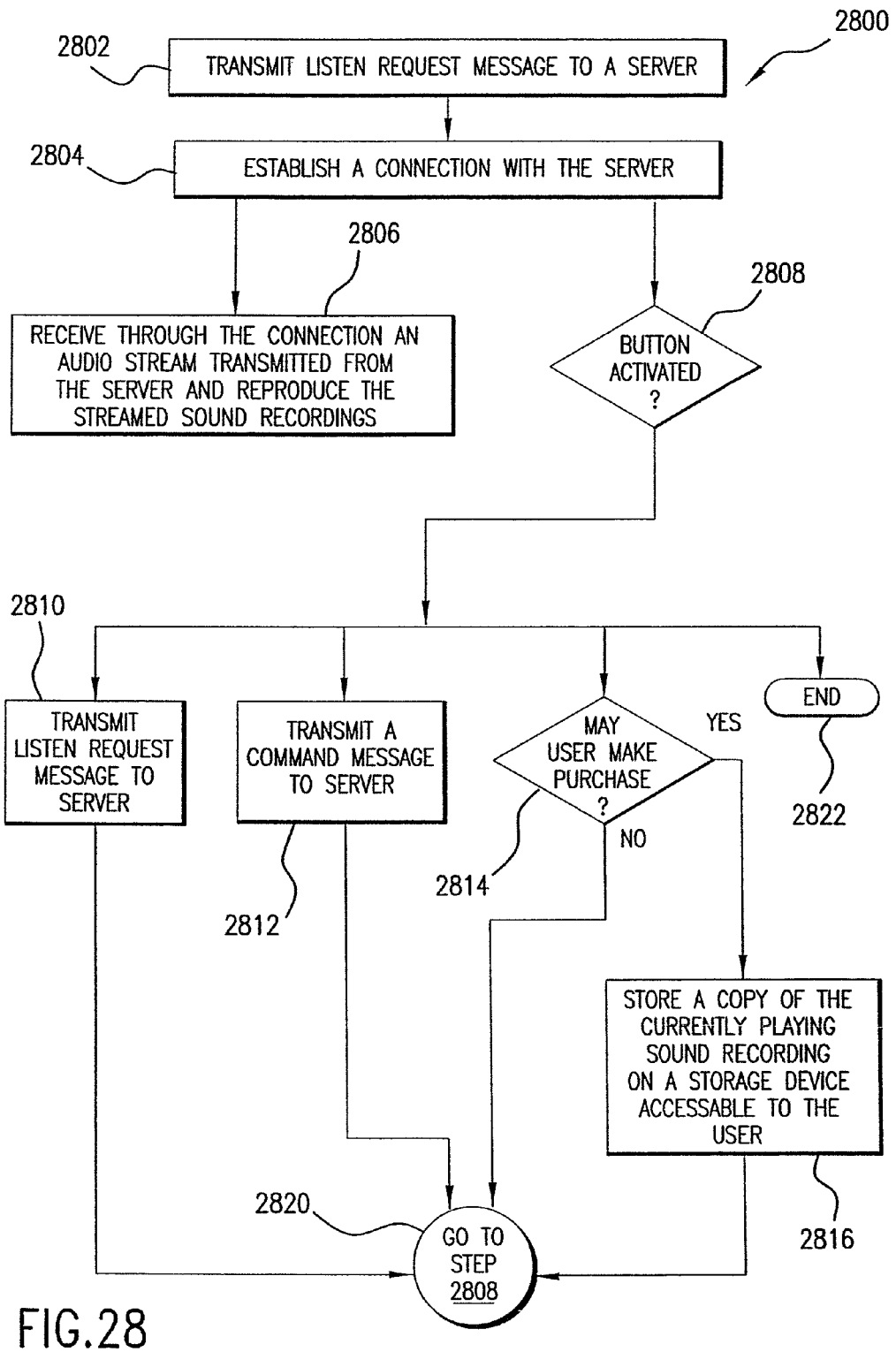

Referring to FIG. 28, process 2800 may be used in the embodiment where device 202 does not maintain a local sound recording library 216.

Process 2800 begins in step 2802, where device 202 transmits a listen request message to a server 280. The listen request message includes an identifier that identifies the audio channel to which user 110 has selected to listen. Next, a connection is established between device 202 and server 280 so that server 280 can stream audio data (e.g., sound recordings) to device 202 for playback to user 110 (step 2804). Next, device 202 receives an audio stream from server 280 and reproduces the sound recording contained in the stream for user 110 to hear (step 2806) and waits for user 110 to activate button 603, 609, 802, 804, 806, 808, or 810 (step 2808). If listen-button 603 is activated, device 202 transmits a listen request message to server 280 (step 2810) and control goes back to step 2808. If off-button 609 is activated, process 2800 ends (step 2822). If next-button 802, more-button 806, like-button 808, or dislike-button 810 are activated, device 202 sends a command message to server 280 (step 2812) and control goes back to step 2808. Server 280 may process the command message in a similar manner as these buttons are processed by device 202 as described in process 900. For example, if next-button 802 is activated, server 280 may stop transmitting the current sound recording and select a new sound recording to stream to device 202.

The command message contains an identifier that identifies which of the buttons was activated. If purchase-button 804 is activated, device 202 or a server 280 determines whether user 110 may purchase the currently playing sound recording. If not, and control goes back to step 2808, otherwise a copy of the currently playing sound recording is stored on a storage device accessible to user 110 and the control goes back to step 2808.

Preferably, in performing process 2600, 2700 and 2800, the sound recordings are selected such that the resulting set of sound recordings that are played matches the profile of the selected audio channel and, preferably, do not violate a statutory, regulatory, or contractual provision.

Creating a New Audio Channel

Figure 16:
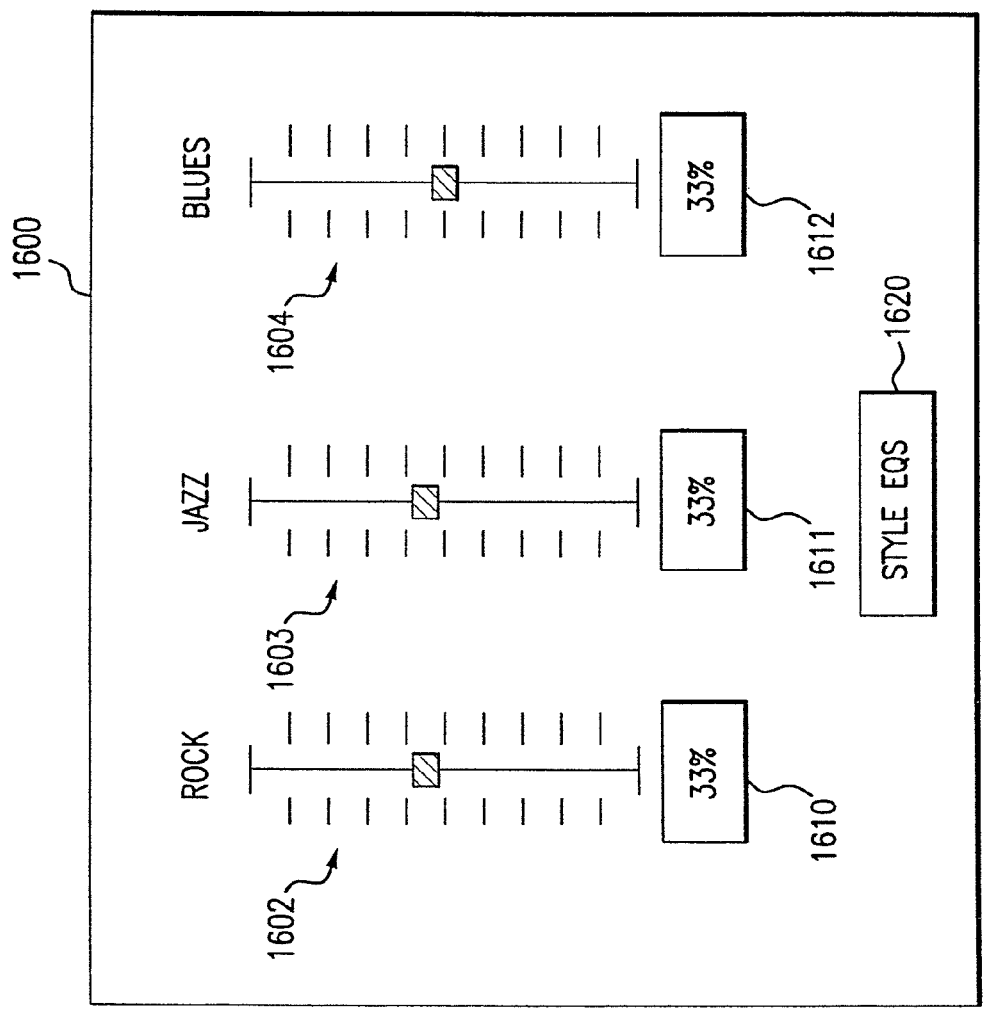
FIG. 16 is an illustration of a genre equalizer for enabling user 110 to specify the genre percentages, according to one embodiment.
Figure 17:
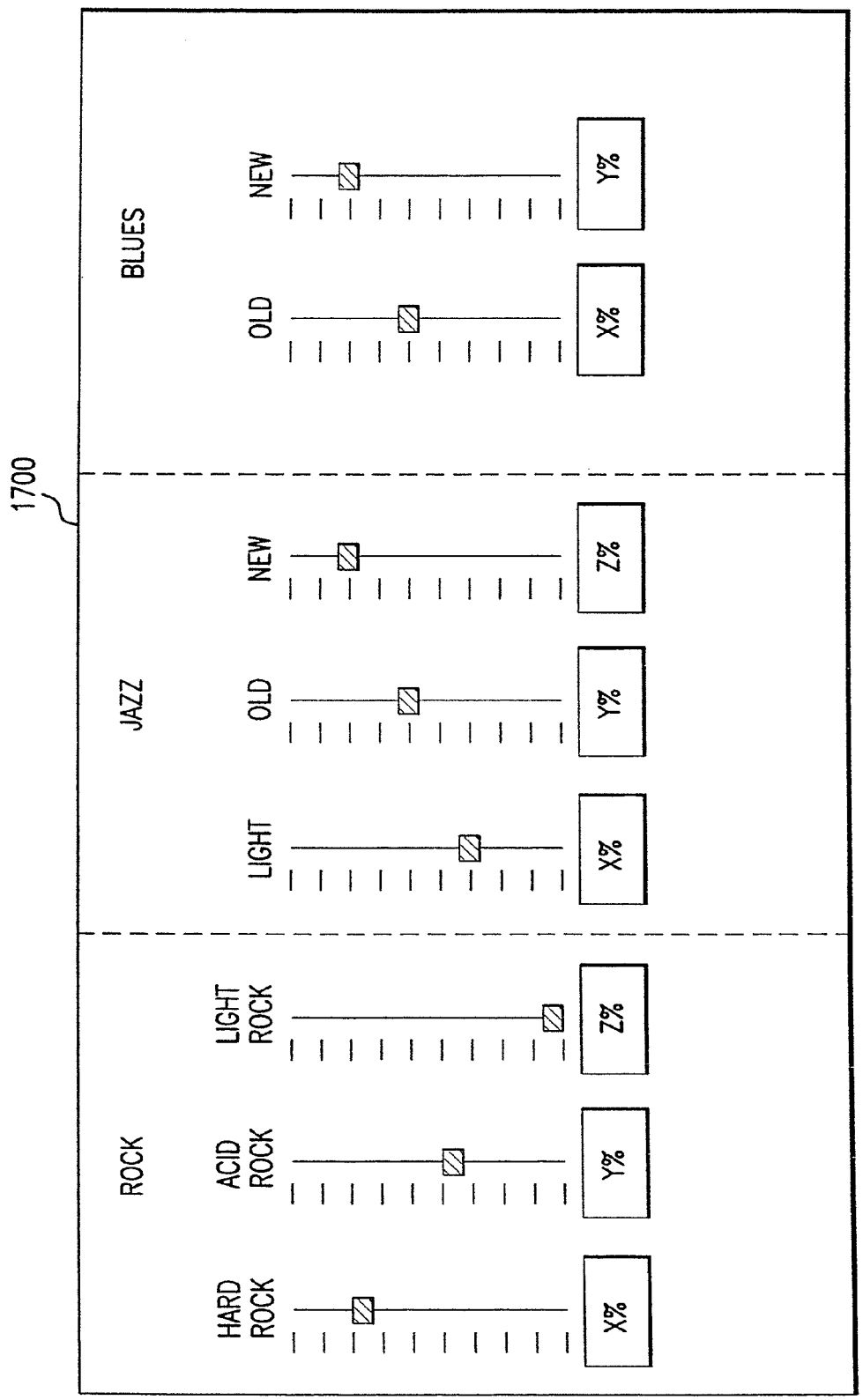
FIG. 17 is an illustration of three style equalizers, according to one embodiment.

One of the most important features of the present invention is providing user 110 with the ability to create and modify audio channels. FIGS. 15-17 are illustrations of possible user interfaces for enabling user 110 to create and modify audio channels. Those skilled in the art will appreciate that the present invention is not limited to the user interfaces illustrated in FIGS. 15-17 or to any particular user interface. As is appreciated by those skilled in the art, any user interface through which user 110 can specify his or her sound recording preferences could be employed in the present invention. In short, FIGS. 15-17 are used merely to illustrate an embodiment of the invention and not to limit the invention.

FIG. 15 illustrates a user interface page 1500. Page 1500 is referred to as the "create/modify profile form." User 110 accesses user interface page 1500 by selecting button 704 on page 700 (see FIG. 7). Page 1500 is a fill-in form that enables user 110 to define or modify an audio channel by inputting his or her sound recording preferences. The information requested by fill-in form 1500 is used to illustrate one set of user preference information. Other information in addition to or instead of the information requested by fill-in form 1500 could be collected from user 110 to create an audio channel.

In filling out form 1500, user 110 might first name the channel by inputting a name into text box 1502. Next, user 110 might select one or more genres of music to be associated with the channel by selecting the appropriate genre check-boxes 1504. For the advanced users, a genre equalizer 1600 (see FIG. 16) can be accessed by selecting the genre equalizer-button 1505.

Genre equalizer 1600 can be used to specify the relative degree to which each of the selected genres dominates the audio channel. The equalizer 1600 employs a fader for each of the selected genres. As shown in FIG. 16 as an example, the selected genres are Rock, Jazz and Blues. Thus, the equalizer 1600 includes three faders: a Rock fader 1602, a Jazz fader 1603, and a Blues fader 1604. By manipulating the faders 1602-1604, user 110 specifies the percent of the audio channel devoted to each of the selected genres. In the above example, Equalizer 1600 also includes three percentage display boxes 1610-1612, one corresponding to Rock 1610, one to Jazz 1611, and one to Blues 1612. Preferably, the percentage of music devoted to each genre is determined by the following formula: % genre=(value of genre)/(total value)

The value of a genre is determined by the position of the fader and the number of positions on each fader. For example, in the equalizer of FIG. 16, each fader has 10 possible positions. Thus each genre (Rock, Jazz, and Blues) can have one of 10 possible values. For example, if the Rock genre has a value of 9, the Jazz genre has a value of 6, and the Blues genre has a value of 3, then the percentage of the audio channel devoted to Rock is 9/(9+6+3) 50%. Similarly, the percentage of the audio channel devoted to Blues is 3/(9+6+3)=16.66%.

Alternatively, instead of manipulating the faders to determine the percent of the audio channel devoted to each of the selected genres, user 110 can simply directly enter the desired percentages into the percentage display text boxes 1610-1612.

In addition to the genre equalizer, there may also provided a style equalizer for each selected genre of music. Thus, in the above example, the software would provide three style equalizers: one for Rock, one for Jazz, and one for Blues. A style equalizer-button 1620 is activated to access the style equalizers.

FIG. 17 illustrates the three style equalizers in the above example, one for each genre. Each genre has one or more associated styles. For example, the Rock genre may have the three associated styles: Hard Rock, Light Rock, and Acid Rock. Each style equalizer functions in the same manner as the genre equalizer. That is, user 110 manipulates the faders to determine the percent of the genre devoted to each style. For example, user 110 can specify that the Rock genre be composed of 80% Hard Rock and 20% Acid Rock. Thus, in the case where user 110 selects the Rock genre to comprise 50% of the audio channel, then 40% of the audio channel would be devoted to Hard Rock and 10% would be devoted to Acid Rock.

Referring back to fill-in form 1500, after specifying the genre percentages and the style percentages, user 110 can do any one or more of the following: (1) input the names of one or more of his or her most favorite and least favorite artists into text boxes 1506 and 1507, respectively, (2) input the names of one or more of his or her most favorite and least favorite sound recordings into text boxes 1508 and 1509, respectively, (3) specify news category of interest by inputting a news category into box 1510, and (4) specify one or more news keywords by inputting one or more keywords into box 1511.

After user 110 has completed entering in the profile information using pages 1500, 1600 and 1700, user 110 selects done-button 1590. In this manner, user 110 is enabled to define personalized audio channels.

In one embodiment, after user 110 selects done-button 1590, the audio channel profile information specified by user in pages 1500, 1600, and 1700 is stored in a channel profile 219 in storage device 214. Additionally, the newly created audio channel may be placed in the active state. Optionally, device 202 may then use wanted list generator 287 and/or playlist generator 288 to create a wanted list 215 and/or a playlist 218 that matches the profile information entered by user 110. Alternatively, if wanted list generator 287 and playlist generator 288 are installed on server 280 instead of in device 202, then device 202 transmits profile 219 to server 280. After receiving profile 219, server 280 uses wanted list generator 287 and/or playlist generator 288 to create a wanted list 215 and/or a playlist 218 that matches the received profile 219, and transmits the wanted list 215 and/or a playlist 218 to device 202 where they are then stored in storage device 214.

In another embodiment, after user 110 selects done-button 1590, the channel profile information specified by user in pages 1500, 1600, and 1700 is transmitted to server 280, which then may store the received profile information in a profile 219. Additionally, the newly created audio channel may be placed in the active state. In this embodiment, the software program 250 can be a web browser or other thin client software. After receiving the audio channel profile information, server 280 uses wanted list generator 287 and/or playlist generator 288 to create a wanted list 215 and/or a playlist 218 that matches the received profile information, and transmits the wanted list 215 and/or playlist 218 to device 202 where they are stored in storage device 214.

If user 110 specifies that U2 is one of his or her favorite artists, a relatively large number of sound recordings from U2 might be placed into the personalized playlist and/or device 202 may select that artist more frequently, but, in one embodiment, in no event is the artist selected so frequently that in doing so device 202 would run afoul of a governing statutory, regulatory or contractual provision (e.g., the DMCA). And if a user specified one or more sound recordings as being favorite, then device 202 might ensure that those sound recordings are placed in the personalized playlist and may select those sound recordings more frequently, but, in one embodiment, in no event are the sound recordings played so often that in doing so device 202 would run afoul of a governing statutory, regulatory or contractual provision. Similarly, in one embodiment, songs from the user's least favorite artists and the user's least favorite songs are not included in the playlist 218 or are included on only a limited basis. Advantageously, wanted list generator 287 and/or a playlist generator 288 could be programmed to determine a set of sound recordings that are similar to the user's favorite sound recordings and to place this set of sound recordings into wanted list 215 and/or a playlist 218.

Because a song recording list 215 or playlist 218 conforms to a profile 219 associated with an audio channel as described above, song recording list 215 or playlist 218 should each contain a list of sound recordings that have a high probability of being enjoyed by user 110.

In an embodiment where user interface 220 is limited (e.g., device 202 is a cable-tv set-top box as opposed to a personal computer), user 110 may use a personal computer (PC) 299 or other like device to create the audio channels instead of directly using device 202. In this embodiment, software program 250 is installed on PC 299. In this embodiment, after user 110 enters the audio channel specification information into pages 1500, 1600, and 1700, the entered information is sent to server 280 or to device 202, which then may store the received information in a profile 219. Server 280 or device 202 then creates a wanted list 215 and/or playlist 218 in the manner described above and, in one embodiment, server 280 then transmits the wanted list 215 and/or playlist 218 to device 202. In this embodiment, the software program 250 can be a web browser or other thin client software and server 280 can implement a web server.

Additional methods for creating and/or modifying a wanted list 215 or playlist 218 are described in U.S. Pat. No. 5,616,876 to Cluts and U.S. Pat. No. 5,819,160 to Foladare et al., both of which are incorporated herein by this reference.

Modifying an Audio Channel's Profile

There are at least two ways in which an audio channel's profile may be modified. One way, which has been described already, is for user 110 to select more-button 806, like-button 808, or dislike-button 810. Another way is for user 110 to select an audio channel listed in box 602 and then activate modify-button 606. After user 110 does this, page 1500 is displayed. Using page 1500, user 110 can modify the profile 219.

Immediately after an audio channel's profile 219 is modified, in one embodiment, the playlist 218 and/or wanted list 215 associated with the modified audio channel may be updated to match the new profile 219.

The Local Sound Recording Library

Referring again to FIG. 2, local sound recording library 216 is a collection of sound recordings that are stored in storage device 214. The invention contemplates a number of mechanisms for building sound recording library 216 (i.e., adding sound recordings to library 216). FIGS. 18-22 are flow charts illustrating example processes that can be used to add sound recordings to local sound recording library 216.

Figure 18:
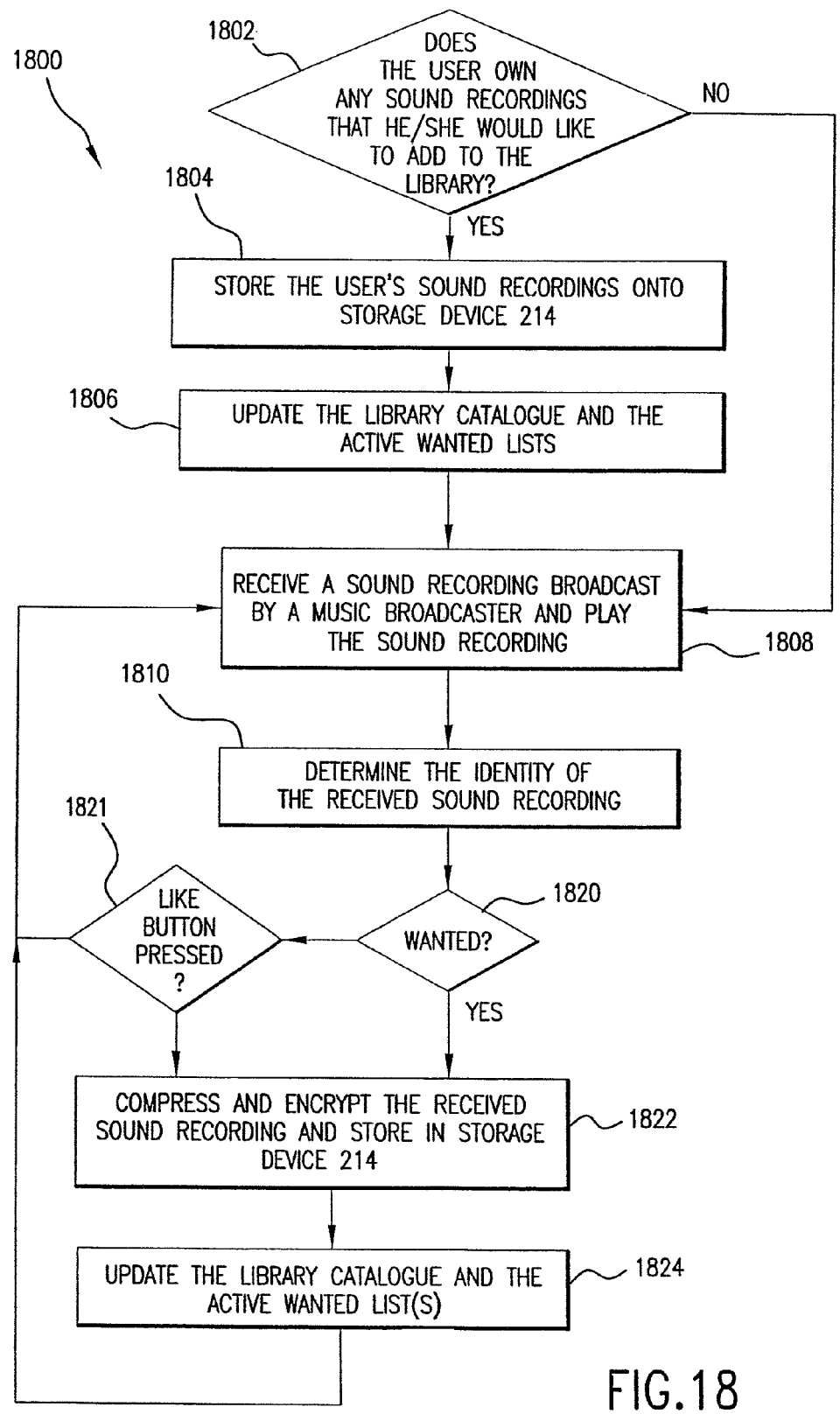
FIGS. 18-22 are flow charts illustrating various processes than can be used to add sound recordings to local sound recording library 216.

Referring to FIG. 18, a process 1800 for adding sound recordings to local sound recording library 216, according to one embodiment, is illustrated. In step 1802, user 110 is queried as to whether he or she owns any sound recordings that he or she would like to add to library 216. If user 110 responds in the negative, control passes to step 1808, otherwise control proceeds to step 1804.

In step 1804, sound recordings owned by user 110 may be stored in storage device 214 (if they are not already stored therein). In one embodiment, a storage device drive 276 (e.g., a floppy disk drive or CD ROM drive) is provided for receiving storage devices containing sound recordings owned by user 110, or user 110 can download the sound recordings the he or she owns from PC 299. Next (step 1806), library catalogue 217 is updated with the appropriate information concerning the sound recordings owned by the user (for example, user 110 may be asked to input the following for each sound recording: the artist's name, the title, the genre(s) to which sound the recording belongs, the styles(s) to which the sound recording belongs, etc.). Next (step 1808), device 202 receives a sound recording that is being broadcast by a music broadcaster (such as music broadcaster 102) and plays the sound recording for user 110. Following step 1808, device 202 determines the identity of the received sound recording (step 1810). In digital and analog audio broadcasting systems it is possible to transmit meta-data along with the sound recordings. The meta-data may include, among other information, a sound recording identifier. This is just one way in which device 202 can determine the identity of the received sound recording. One possessing ordinary skill in the relevant art will appreciate that the invention is not limited to this or any particular means for identifying sound recordings and that a variety of identifying means are available.

After step 1810 control passes to step 1820. In step 1820, device 202 determines whether the received sound recording is a "needed" sound recording. A "needed" sound recording is a sound recording that is not in the sound recording library 216 and that matches an active profile 219 or is listed in an active wanted lists 215. An active wanted list 215 is a wanted list 215 that is associated with an active audio channel. Similarly, an active profile 219 is a profile 219 that is associated with an active audio channel.

Preferably, device 202 maintains a list of all needed sound recordings. This list is referred to as the needed list. If the received sound recording is needed, control passes to step 1822, otherwise it passes to step 1821. In step 1821, device 202 determines whether user 110 has indicated a preference for the sound recording being played. In one embodiment, user 110 can indicate his or her preference for a sound recording that is playing by activating a like button on user interface 220 during the play of the sound recording. If user has indicated his or her preference for the sound recording being played, then control passes to step 1822, otherwise control goes back to step 1808.

If the sound recording is needed or user 110 has indicated a preference for the sound recording, device 202 adds the sound recording to the library 216. That is, in one embodiment, device 202 performs steps 1822 and 1824. In step 1822, device 202 stores the sound recording in storage device 214. Preferably, the sound recording is also encrypted so that user 110 will not have direct access to the sound recording stored in storage device 214. Additionally, in one embodiment, a watermark is added to the sound recording before it is encrypted. Next (step 1824), device 202 updates the library catalogue 217 (i.e., adds a new entry thereto), updates the active wanted lists 215 (if any) that list the received sound recording to indicate that the sound recording is now in library 216. After step 1824, control passes back to step 1808.

Figure 19:
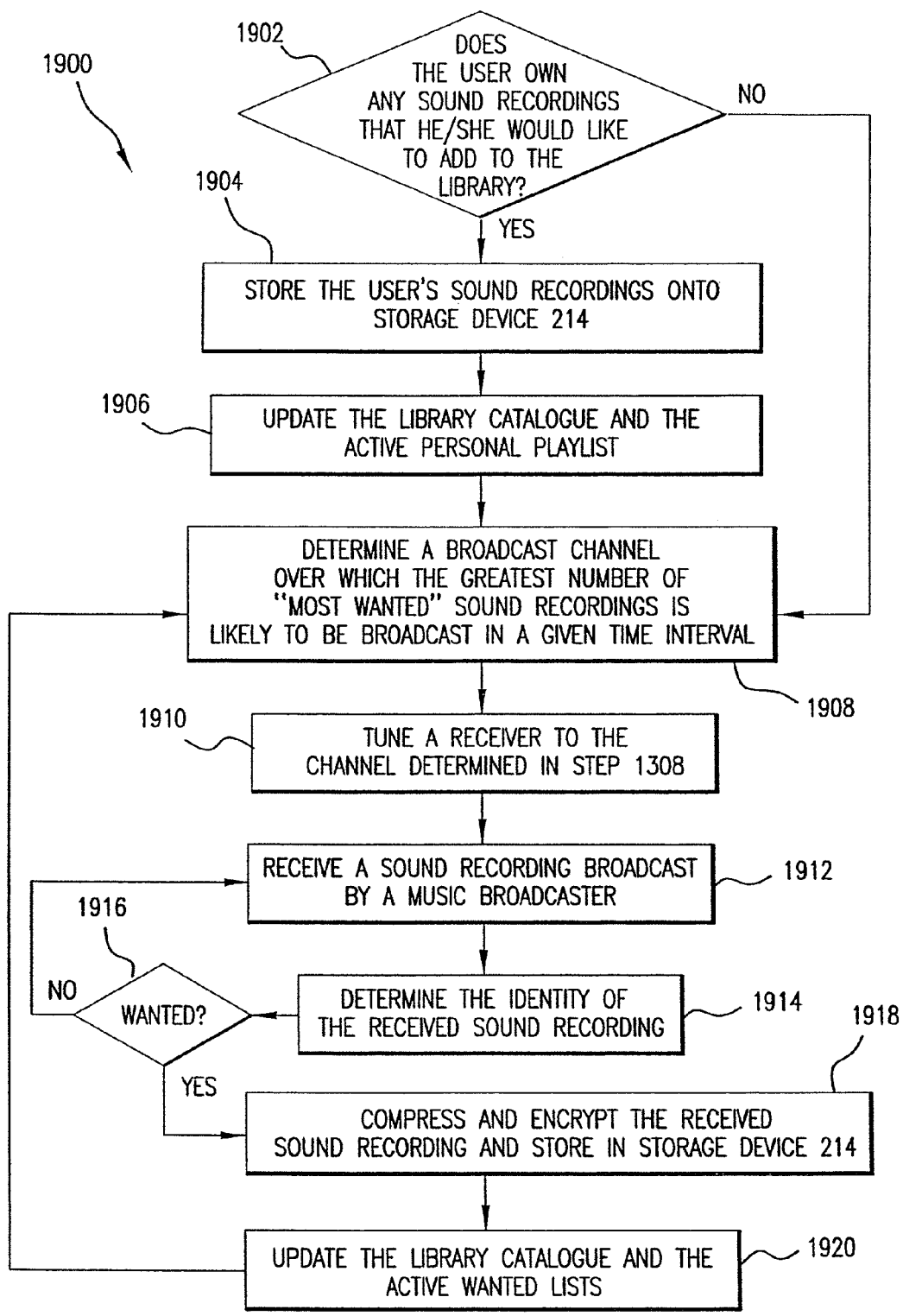

Referring now to FIG. 19, a process 1900 for adding sound recordings to local sound recording library 216, according to another embodiment, is illustrated. In this embodiment, a wanted list 215 is stored in storage device 214 for each active audio channel. Process 1900 may be most useful where device 202 includes at least two receivers 210, but is not limited to this environment. The first receivers is referred to as the primary receiver and the second is referred to as the secondary receiver. The secondary receiver is the receiver that is not being used by user 110 to receive a broadcast at the current point in time. Steps 1902-1906 are identical to steps 1802-1806 and will not be described here.

In step 1908, device 202 determines a broadcast channel over which the greatest number of "most needed" sound recordings are likely to be broadcast in any given time interval. In one embodiment, a "most needed" sound recording is a sound recording that is not in library 216 and that is listed in the wanted list 215 belonging to the highest ranked active audio channel. In this embodiment, step 1908 may be performed by the following two steps: first, determining the highest ranked audio channel that has one or more sound recordings listed in its associated wanted list 215 that are not stored in library 216; and second, determining the broadcast channel that most closely matches the profile of the audio channel determined in the first step.

In another embodiment, a "most needed" sound recording is a sound recording that is not in library 216 and that matches the profile 219 of the highest ranked active audio channel for which a playlist 218 cannot be generated because of the contents (or lack of content) in local sound recording library 216. In yet another embodiment, a "most needed" sound recording is a sound recording that is not in library 216 and that matches the profile 219 of the highest ranked active audio channel.

User 110, in one embodiment, may manually rank the active audio channels. As is evident to one skilled in the art, user interface page 600 can easily be modified to enable user 110 to rank the active audio channels. In another embodiment, device 202 is programmed to determine the highest ranked active audio channel. For example, device 202 can monitor user 111's use of device 202 to determine which active audio channel user 110 listens to the most. Device 202 would then rank that channel the highest.

After step 1908 control passes to step 1910. In step 1910, device 202 tunes a receiver 210 to the channel determined in step 1908. In the embodiment where there are multiple receivers, a process like process 1900 can be performed in parallel for each receiver that is not being used by user 110 to listen to a station. Next (step 1912), the receiver 210 receives a sound recording broadcast over the channel determined in step 1908. The identity of the received sound recording is then determined (step 1914). After step 1914 control passes to step 1916. In step 1916, device 202 determines whether the received sound recording is a needed sound recording. If the received sounds recording is needed, control passes to step 1918, otherwise control goes back to step 1912.

In step 1918, device 202 stores the sound recording in storage device 214. Preferably, the sound recording is also encrypted so that user 110 will not have direct access to the sound recording. Next (step 1920), device 202 updates the library catalogue 217 and updates the wanted list(s) 215 that list the received sound recording to indicate that the sound recording is now in library 216. After step 1920, control passes back to step 1908.

Figure 20:
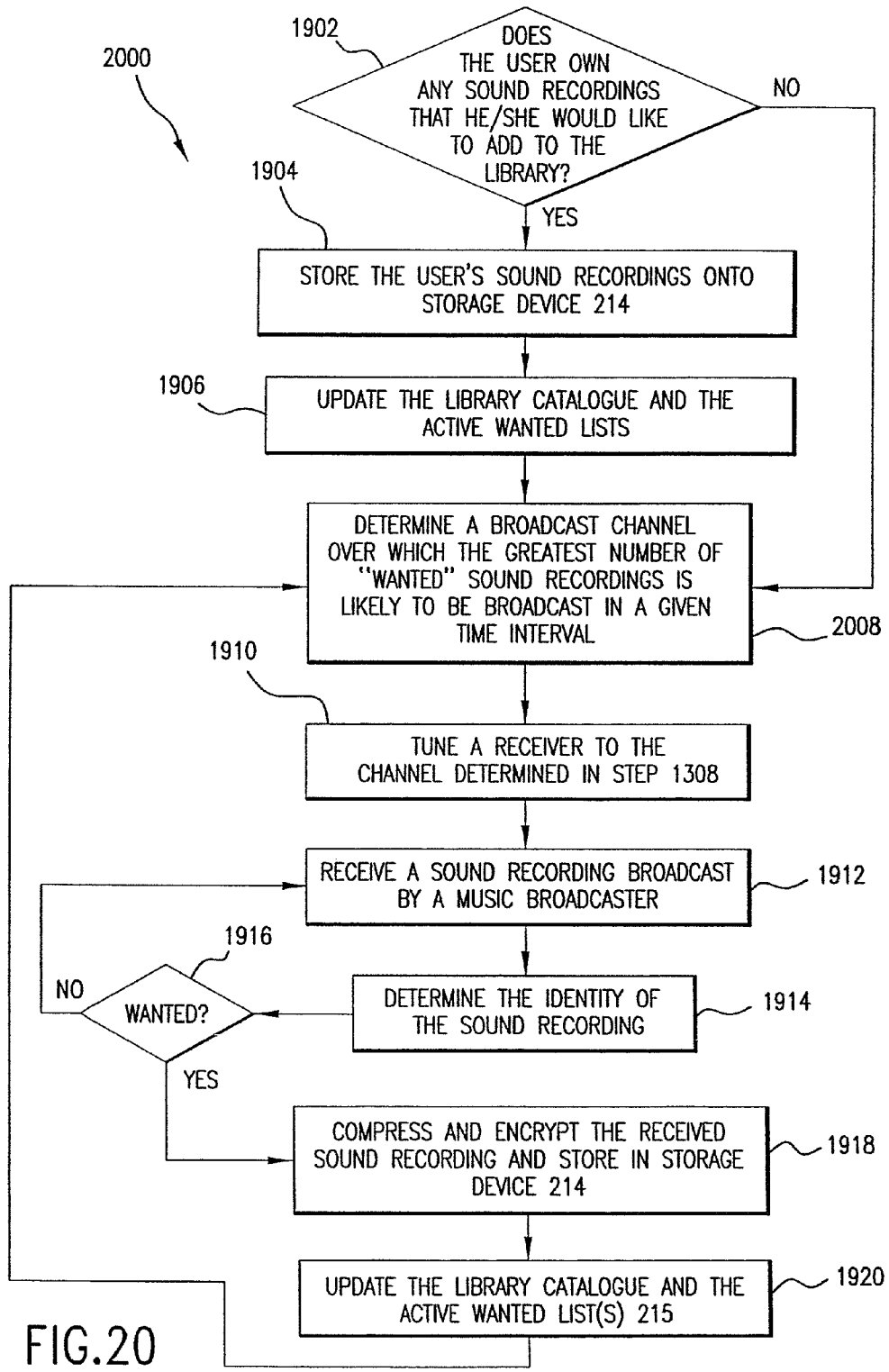

Referring now to FIG. 20, a process 2000 for adding sound recordings to local sound recording library 216, according to another embodiment, is illustrated. In this embodiment, a wanted list 215 is stored in storage device 214 for each active audio channel. Process 2000 is identical to process 1900 with the exception of step 2008.

In step 2008, device 202 determines a broadcast channel over which the greatest number of "needed" sound recordings are likely to be broadcast in any given time interval. A "needed" sound recording is a sound recording that is not in library 216 and that is listed in any one of the active wanted lists 215. In one embodiment, to determine the channel over which the greatest number of needed sound recordings are likely to be broadcast in any given time interval, device 202 first determines which active wanted list 215 has the greatest number of needed sound recordings and then determines which broadcast channel most closely matches the audio channel to which the active wanted list 215 that has the greatest number of needed sound recordings is associated. For example, if the active wanted list 215 that has the greatest number of needed sound recordings is associated with an audio channel that is dominated by the Jazz genre, then a broadcast channel that broadcasts mostly Jazz music would be the channel determined in step 2008.

Figure 21:
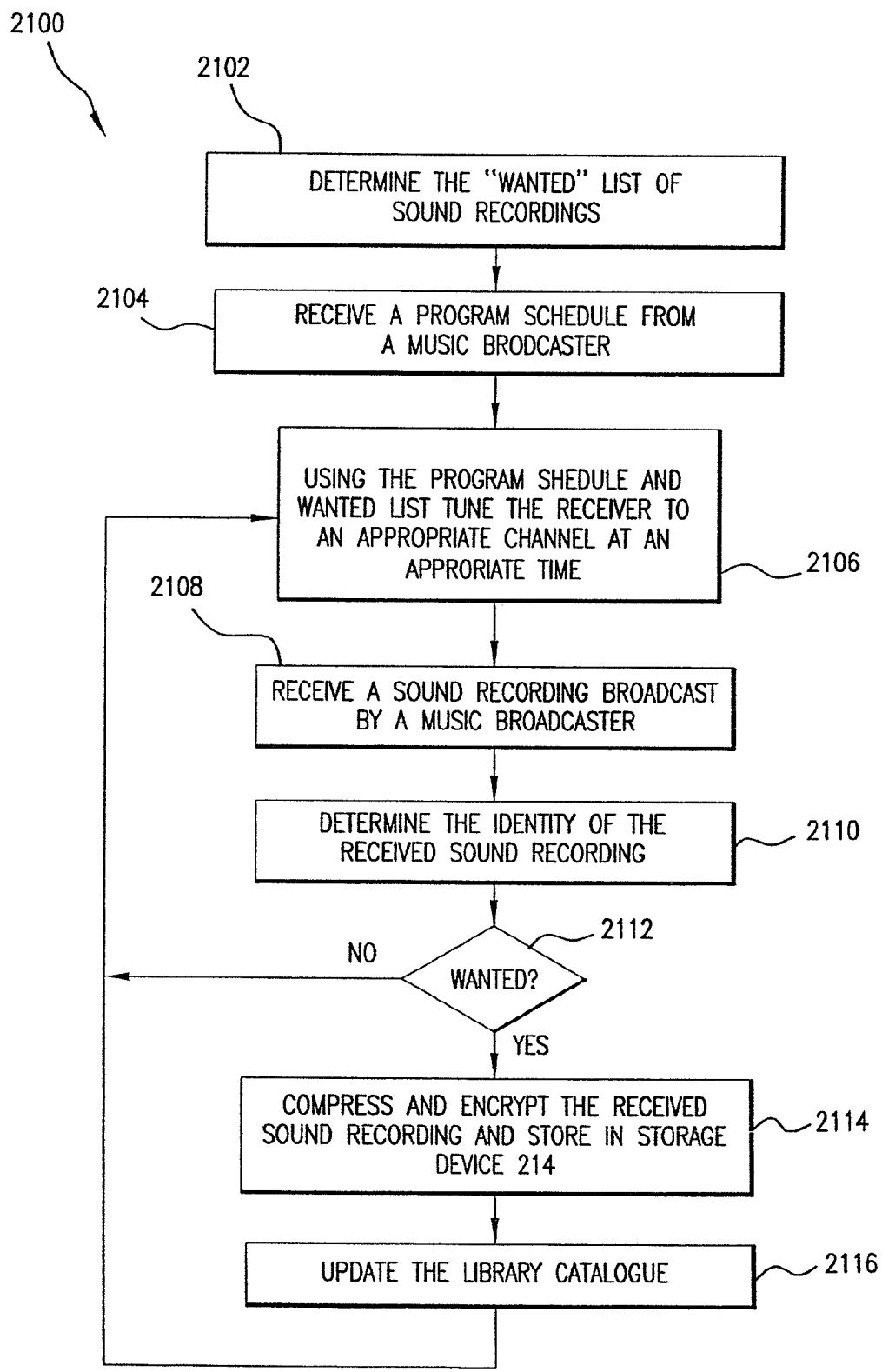

Referring now to FIG. 21, a process 2100 for adding sound recordings to local sound recording library 216, according to another embodiment, is illustrated. Process 2100 is useful where device 202 includes two receivers 210, a primary receiver and a secondary receiver. Although not illustrated in process 2100, steps 1902-1906 of process 1900 are contemplated as being part of process 2100.

In step 2102, device 202 creates the needed list of sound recordings, and in step 2104 device 202 receives a program schedule from music broadcaster 102. Preferably, the program schedule contains a list of sound recording identifiers, the approximate time when each identified sound recording will be broadcast, and the channel over which the sound recording will be broadcast. Preferably, for the purpose of complying with legal or contractual requirements, the content of the program schedule is not allowed to be viewed or otherwise discovered by user 110. In one embodiment this is achieved through encryption. That is, music broadcaster 102 may encrypt the program schedule before transmitting it to device 202 and user 110 has no way of accessing the "key" to decrypt the program schedule.

After receiving the program schedule and after creating the needed list, device 202 uses them both to tune receiver 210 and/or a secondary receiver(s) 210 to an appropriate channel at an appropriate time (step 2106). For example, if the needed list indicates that a particular sound recording is needed and the program schedule indicates that the particular sound recording will be broadcast on channel B at approximately 10:30 p.m., then device 202 would tune a receiver 210 to channel B at some point prior to 10:30 p.m.

After step 2106, control passes to step 2108. In step 2108, device 202 receives a sound recording broadcast by music broadcaster 102. Next, device 202 determines the identity of the received song (step 2110). Then, in step 2112, device 202 determines whether the received sound recording is on the needed list. If the received sounds recording is needed, control passes to step 2114, otherwise control goes back to step 2106.

In step 2114, device 202 stores the sound recording in storage device 214. Preferably, the sound recording is also encrypted so that user 110 will not have direct access the sound recording. Next (step 2116), device 202 updates the library catalogue 217, updates the active wanted list(s) 215 that list the received sound recording to indicate that the sound recording is now in library 216, and removes the sound recording from the needed list. After step 2116, control passes back to step 2106.

Figure 22:
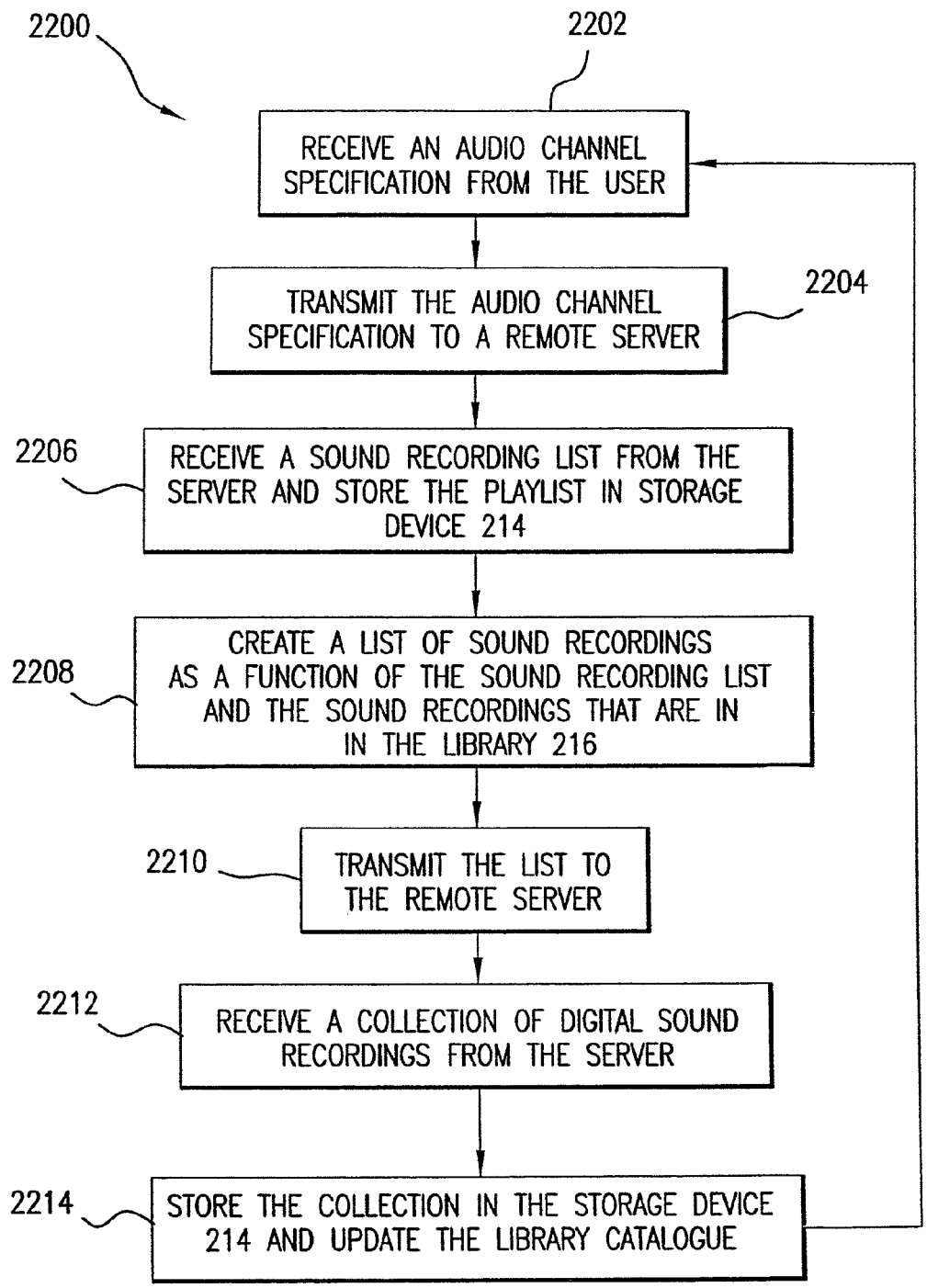

Referring now to FIG. 22, a process 2200 for adding sound recordings to local sound recording library 216, according to still another embodiment, is illustrated. Although not illustrated in process 2200, steps 1802-1806 of process 1800 are contemplated as being part of process 2200.

In step 2202, device 202 receives from user 110 a specification for a new audio channel and creates a channel profile 219 from this information. As described above, user 110 may enter channel profile information into device 202 using GUI pages 1500, 1600, and 1700. Next (step 2204), device 202 transmits the channel profile information to a remote server 280. Remote sever 280 uses the channel profile information to create a wanted list 215. Remote server 280 then transmits the wanted list 215 to device 202.

Upon receiving wanted list 215, device 202 stores the list in storage device 214 (step 2206). Next (step 2208), device 202 creates a "needed" list of sound recordings based on the sound recordings identified in the received wanted list and based upon the sound recordings that are in library 216. That is, the needed list of sound recordings contains the sound recordings identified in the received list that are not currently part of library 216.

After creating the needed list, the needed list is transmitted to server 280 (step 2210). After receiving the needed list, server 280 electronically transmits to device 202 each sound recording identified in the needed list. Alternatively, server 280 creates an archive on a portable recording medium (e.g., a CD ROM, a floppy disk, or other like recording medium) containing each song on the needed list and the portable recording medium is delivered to user 110 through conventional package delivery means (e.g., FedEx, UPS, US Mail). Device 202 receives the transmitted sound recordings (step 2212) and stores each sound recording in storage device 214 and updates library catalogue 217 and wanted list as required.

In the embodiment where the sound recordings are delivered to user 110 via a portable recording medium, user 110 inserts the recording medium into storage drive 276 (e.g., CD ROM drive, floppy disk drive, etc.) so that the sound recordings stored on the portable recording medium can be copied to storage device 214 and placed in library 216. Preferably, the sound recordings stored on the portable recording medium can only be played by device 202 in conjunction with an audio channel. Furthermore, device 202 does not provide user 110 with a mechanism for directly accessing any of the sound recordings on the storage portable medium. Thus, the only way for listener 110 to hear any of the sound recordings on the storage portable medium is to listen to an audio channel provided by device 202.

In an alternative embodiment, in step 2204, device 202 additionally transmits library catalogue 217 to server 280. In this embodiment, step 2206 may be skipped, server 280 performs step 2208, and step 2210 is skipped.

Because the amount of storage space available in storage device 214 may be limited, it may be necessary to periodically or occasionally remove sound recordings from library 216. One method that could be employed to "clean" the library is to remove all sound recordings that have not been accessed within a predetermined amount of time. Additionally, user 110 may decide to de-active a channel and ultimately delete the channel by selecting it and activating delete-button 608. In one embodiment, when a channel is deleted, the sound recordings in library 216 that fit the profile of the delete channel and do not fit any profile of an active channel, those sound recording may be deleted from the library, and any play-list 218 and/or wanted-list 215 associated with the deleted channel may also be deleted. As is evident to one skilled in the art, a wide variety of other "cleaning" mechanisms are available.

Updating the Wanted Lists

Because new sound recordings are always being created, it is important to occasionally update wanted lists 215, to the extent there are any. There are a variety of processes that could be employed to update wanted lists 215 and the invention is not limited to any one in particular. For the sake of completeness, a preferred process is described below with reference to FIG. 23.

Figure 23:
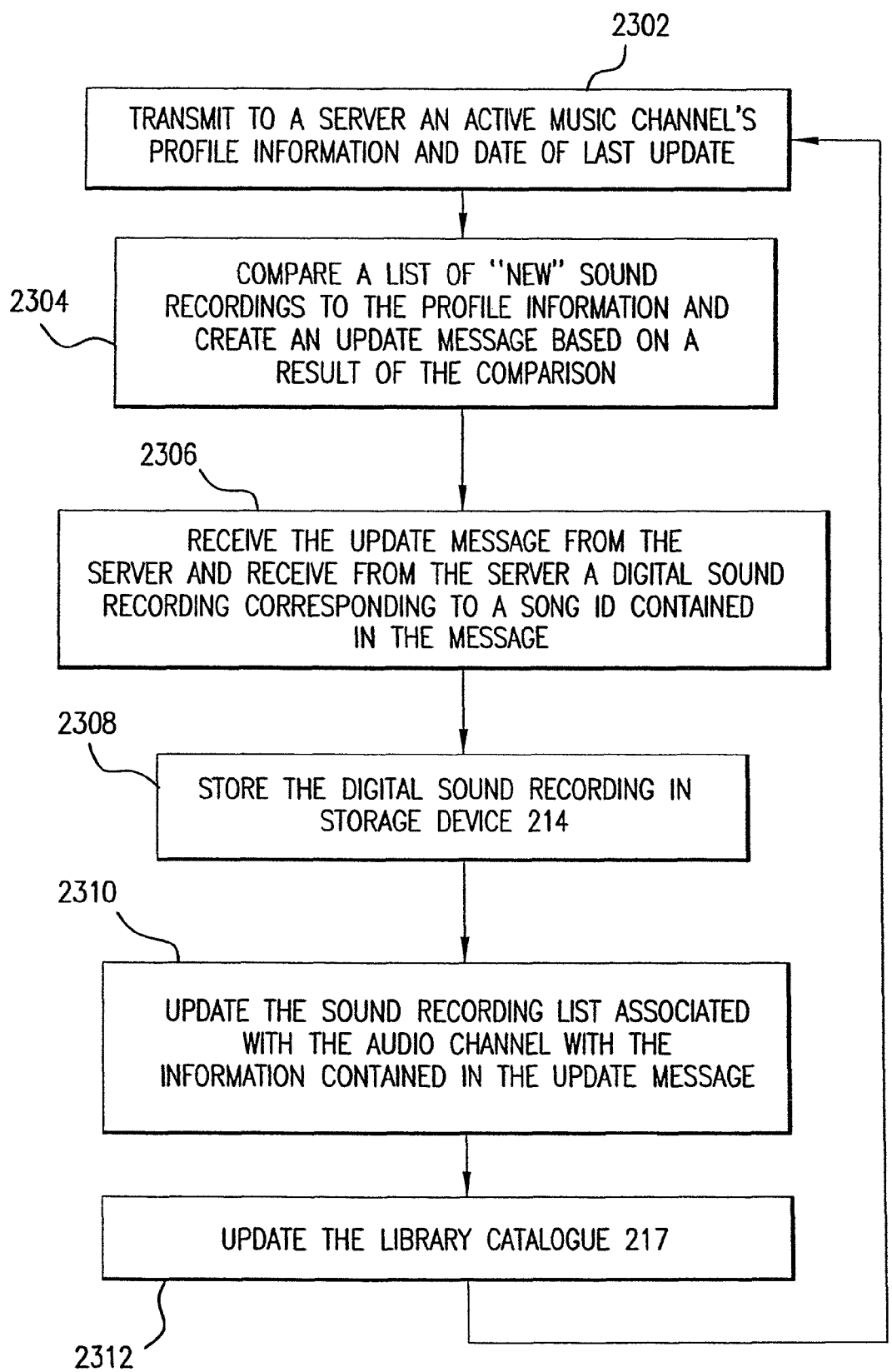
FIG. 23 is a flow chart illustrating a process for updating a wanted list, according to one embodiment.

FIG. 23 is a flow chart illustrating a process for updating wanted lists 218. The process begins in step 2302 where device 202 transmits to server 280 an active audio channel's profile information (e.g., which genres are included in the audio channel and which styles are included in each genre) and the date the wanted list 215 associated with the audio channel was last updated. The server 280 uses this information to create an update message. Preferably, in creating the update message, server 280 compares a list of "new" sound recordings (a "new" sound recording in one that was loaded on the server on or after the date when the wanted list was last updated) to the received profile information to determine whether any of the "new" sound recordings match the received profile information (step 2304). After performing the comparison, the server transmits one or more update messages to device 202 depending on whether any of the new sound recordings fit the channel profile. An update message includes a sound recording identifier that identifies a unique sound recording that fits the channel profile. The update message may also include meta-data concerning the identified sound recording. The meta-data included in the update message may include such information as a list of genres and styles that apply to the identified sound recording. As discussed previously, a sound recording my belong to more than one genre of music and may be associated with more than one style.

If the server transmits an update message, then the server may also transmit to device 202 a copy of the sound recording identified in the update message. Preferably, the copy of the sound recording is encrypted prior to being transmitted to device 202.

Device 202 receives the update message and sound recording (step 2306). Upon receiving the copy of the sound recording, device 202 stores the copy in storage device 214 (step 2308). Similarly, upon receiving the update message, device 202 updates the appropriate wanted list 218 and updates library catalogue 217 (steps 2310 and 2312). Process 2300 is performed for each active audio channel on an occasional or periodic basis.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for providing a customized media service to a user having a consumer device, comprising:

displaying on a display of the consumer device a one or more station names, wherein each of the one or more stations names identifies a station and at least one of the station names identifies a customized station created by the user;

after the user selects to listen to one of the identified stations, transmitting, from the consumer device, a first request to a server, which, in response to the first request, transmits a first recording to the consumer device;

receiving the first recording at the consumer device and storing the first recording in a storage unit of the consumer device;

playing the first recording in response to receiving the first recording;

after transmitting the first request and before the first recording finishes playing, transmitting, from the consumer device, a second request to a server, which, in response to the second request, transmits a second recording to the consumer device;

receiving the second recording at the consumer device;

storing the second recording in the storage unit of the consumer device;

displaying a dislike button on the display while the first recording is being played; and in response to the user activating the dislike button, performing the steps of: (a) stopping playing of the first recording, (b) deleting the first recording from the storage unit, and (c) playing the second recording.

2. The method of claim 1, further comprising:

transmitting, from the consumer device and before the second recording finishes playing but after the first recording finished playing, a third request to a server, which, in response to the third request, transmits a third recording to the consumer device;

receiving the third recording at the consumer device;

storing the third recording in the storage unit of the consumer device; and immediately after the second recording finishes playing, playing the third recording.

3. The method of claim 1, further comprising:

while playing the first recording, enabling the user to select to listen to a different station; and in response to the user selecting to listen to a different station while the first recording is playing, deleting the first recording and the second recording from the storage unit.

4. The method of claim 1, wherein the first recording has a title, and wherein the method further comprises: displaying the title of the first recording while the first recording is being played, but not displaying any title associated with the second recording until (a) such time as the second recording is played or (b) a point in time immediately prior to the playing of the second recording.

5. The method of claim 1, further comprising:

displaying on the display a selectable element for enabling the user to indicate that the user would like to create a station; and displaying on the display a user interface that prompts the user to enter one or more artists or songs in response to the user selecting the selectable element.

6. The method of claim 1, wherein the step of storing the second recording in the storage unit of the consumer device comprises storing the second recording such that the user does not have direct access to the second recording.

7. The method of claim 1, further comprising:

prior to transmitting the first request, transmitting to a server a request for a set of recording identifiers; and receiving the set of recording identifiers from the server, each recording identifier in the set identifying a recoding, wherein the set of identified recordings matches said identified station to which the user has selected to listen.

8. The method of claim 7, wherein the set of recording identifiers includes a first recording identifier that identifies the first recording and a second recording identifier that identifies the second recording.

9. The method of claim 8, wherein the first request includes the first recording identifier or an identifier derived from the first recording identifier.

10. The method of claim 9, wherein the step of transmitting the first request to the server is performed automatically by the consumer device as a result of the user selecting to listen to one of the identified stations.

11. The method of claim 10, wherein the step of transmitting the first request to the server is performed automatically by the consumer device as a direct and immediate result of the user selecting to listen to one of the identified stations.

12. The method of claim 10, wherein the step of transmitting the second request to the server is performed automatically by the consumer device as a result of the user selecting to listen to one of the identified stations.

13. The method of claim 12, further comprising:

accessing the set of recording identifiers to retrieve the second recording identifier that identifies the second recording, wherein the accessing step: (a) occurs prior to the step of transmitting the second request to the server and (b) is performed automatically by the consumer device as a result of the user selecting to listen to one of the identified stations.

14. A computer program product comprising a computer storage device storing computer software executable by a processing system, wherein the computer software comprises:

a first set of instructions that when executed by the processing system causes the processing system to display one or more stations names, wherein each of the one or more stations names identifies a station and at least one of the station names identifies a customized station created by the user;

a second set of instructions that when executed by the processing system causes the processing system to transmit a first request to a server, which is configured to transmit a first recording to the processing system in response to receiving the first request, wherein the computer software is configured such that the second set of instructions is executed after the user selects a station identified by one of the station names;

a set of instructions that when executed by the processing system causes the processing system to play the first recording in response to the processing system receiving the first recording;

a set of instructions that when executed by the processing system causes the processing system to transmit a second request to a server after transmitting the first request but before the first recording finishes playing, which server is configured to transmit a second recording to the processing system in response to the second request;

a set of instructions that when executed by the processing system causes the processing system to store the second recording in a storage unit of the processing system as the second recording is being received from the server; and a set of instructions that when executed by the processing system causes the processing system to play the second recording immediately after the first recording finishes playing, wherein the computer software further comprises a set of instructions that when executed by the processing system causes the processing system to delete the first recording and the second recording from the storage unit in response to the user selecting to listen to another station while the first recording is playing.

15. The computer program product of claim 14, wherein the computer software further comprises:

a set of instructions that when executed by the processing system causes the processing system to transmit, before the second recording finishes playing but after the first recording finished playing, a third request to a server, which is configured to transmit a third recording to the consumer device in response to the third request;

a set of instructions that when executed by the processing system causes the processing system to store the third recording in the storage unit of the consumer device; and a set of instructions that when executed by the processing system causes the processing system to play the third recording immediately after the second recording finishes playing.

16. The computer program product of claim 14, wherein the computer software further comprises:

a set of instructions that when executed by the processing system causes the processing system to display a dislike button on the display while the first recording is being played;

a set of instructions that when executed by the processing system causes the processing system to perform the following actions immediately in response to the user activating the dislike button: (a) stop playing of the first recording, (b) delete the first recording from the storage unit, and (c) play the second recording.

17. The computer program product of claim 14, wherein the first recording has a title, and the computer software further comprises a set of instructions that when executed by the processing system causes the processing system to display the title of the first recording while the first recording is being played, but not display any title associated with the second recording until (a) such time as the second recording is played or (b) a point in time immediately prior to the playing of the second recording.

18. The computer program product of claim 14, wherein the computer software further comprises:

a set of instructions that when executed by the processing system causes the processing system to display on the display a selectable element for enabling the user to indicate that the user would like to create a station; and a set of instructions that when executed by the processing system causes the processing system to display on the display a user interface that prompts the user to enter one or more artists or songs in response to the user selecting the selectable element.

19. The computer program product of claim 14, wherein the set of instructions for storing the second recording in the storage unit of the consumer device comprises computer instructions for protecting the second recording so that the user does not have direct access to the second recording.

20. The computer program product of claim 14, wherein the computer software further comprises:

prior to transmitting the first request, transmitting to a server a request for a set of recording identifiers; and receiving the set of recording identifiers from the server, each recording identifier in the set identifying a recoding, wherein the set of identified recordings matches said identified station to which the user has selected to listen.

21. The computer program product of claim 20, wherein the set of recording identifiers includes a first recording identifier that identifies the first recording and a second recording identifier that identifies the second recording.

22. The computer program product of claim 21, wherein the first request includes the first recording identifier or an identifier derived from the first recording identifier.

* * * * *